United States Patent
Yang et al.

(10) Patent No.: US 12,503,345 B1
(45) Date of Patent: Dec. 23, 2025

(54) METHOD FOR DETERMINING ALIGNMENT STATE, CONTROLLER, AND MATERIAL HANDLING EQUIPMENT

(71) Applicant: VisionNav Robotics USA Inc., Acworth, GA (US)

(72) Inventors: Siqi Yang, Acworth, GA (US); Yujie Lu, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/087,051

(22) Filed: Mar. 21, 2025

(30) Foreign Application Priority Data

Jan. 27, 2025 (CN) .......................... 202510127551.2

(51) Int. Cl.
  *B66F 9/075* (2006.01)
  *B66F 9/06* (2006.01)
  *G06V 10/75* (2022.01)
  *G06V 20/56* (2022.01)

(52) U.S. Cl.
  CPC ............ *B66F 9/0755* (2013.01); *B66F 9/063* (2013.01); *G06V 10/751* (2022.01); *G06V 20/56* (2022.01)

(58) Field of Classification Search
  CPC ...... B66F 9/0755; B66F 9/063; G06V 10/751
  See application file for complete search history.

(56) References Cited

U.S. PATENT DOCUMENTS

| | | | | |
|---|---|---|---|---|
| 2022/0332524 A1* | 10/2022 | Matsuoka | ............ | B25J 15/0052 |
| 2023/0406681 A1* | 12/2023 | Wu | .................. | G01S 17/89 |
| 2024/0017417 A1* | 1/2024 | Ye | ..................... | H04N 23/54 |
| 2024/0173866 A1* | 5/2024 | Kanunikov | ............ | B65G 61/00 |
| 2024/0407663 A1* | 12/2024 | Pietsch | .................. | G06T 5/90 |
| 2024/0412505 A1* | 12/2024 | Yonezawa | ............... | G06F 18/22 |

FOREIGN PATENT DOCUMENTS

| | | |
|---|---|---|
| CN | 112660686 B | 6/2021 |
| CN | 115123839 B | 12/2022 |
| CN | 115471730 A | 12/2022 |

OTHER PUBLICATIONS

Zhang et al., H. Visual manipulation relationship recognition in object-stacking scenes, Google Scholar, Elsevier, Pattern Recognition Letters, vol. 140, Dec. 2020, pp. 34-42. (Year: 2020).*

* cited by examiner

*Primary Examiner* — Russell Frejd
(74) *Attorney, Agent, or Firm* — Westbridge IP LLC

(57) ABSTRACT

A method for determining an alignment state includes: acquiring, by using a sensor, target images of a first stacking object and a second stacking object; acquiring, from the target images, a first target image region of the first stacking object and a second target image region of the second stacking object; and determining a pixel difference between the first target image region and the second target image region, and comparing the pixel difference with a threshold, to determine an alignment state between the first stacking object and the second stacking object. Embodiments of the present disclosure are used to implement alignment between a first stacking object and a second stacking object during stacking.

19 Claims, 12 Drawing Sheets

METHOD FOR DETERMINING ALIGNMENT STATE, CONTROLLER, AND MATERIAL HANDLING EQUIPMENT

CROSS-REFERENCE TO RELATED APPLICATIONS

The present application claims priority to Chinese Patent Application No. 202510127551.2, filed on Jan. 27, 2025, which is hereby incorporated by reference in its entirety.

TECHNICAL FIELD

The present disclosure relates to the field of warehousing and logistics technologies, and in particular, to a method for determining an alignment state, a controller, and material handling equipment.

BACKGROUND

A system that uses material handling equipment such as an Automated Guided Vehicle (AGV) during operation has advantages such as being highly unmanned, automated, and intelligent, which improves production efficiency and an operational level in industries such as warehousing, manufacturing, and logistics. In a typical scenario, material handling equipment is often responsible for moving various goods, during which stacking of goods is inevitably involved. The goods are usually packed by using a cardboard box or the like, or stored by using a material cage, a wooden box, a plastic box, or the like.

In consideration of space utilization, stacking objects such as cardboard boxes, material cages, and wooden boxes that are loaded with goods may be stacked in a process of moving the goods by the material handling equipment. In view of stability, the material handling equipment is required to accurately stack one stacking object onto another stacking object. In this process, if the two stacking objects cannot be aligned, operation safety may be affected.

SUMMARY

The present disclosure provides a method for determining an alignment state, a controller, and material handling equipment, to control a first stacking object and a second stacking object to be aligned with each other during stacking.

According to a first aspect, a method for determining an alignment state is provided, where the method includes: acquiring, by a controller by using a sensor, target images of a first stacking object and a second stacking object; acquiring, by the controller from the target images, a first target image region of the first stacking object and a second target image region of the second stacking object; and determining, by the controller, a pixel difference between the first target image region and the second target image region, and comparing, by the controller, the pixel difference with a threshold, to determine an alignment state between the first stacking object and the second stacking object.

According to a second aspect, a controller is provided, where the controller is configured to execute program instructions, to implement any method according to the first aspect.

According to a third aspect, material handling equipment is provided, including a controller, where the controller is configured to execute program instructions, to implement any method according to the first aspect.

BRIEF DESCRIPTION OF THE DRAWINGS

To describe the technical solutions in embodiments of the present disclosure or in the conventional technology more clearly, the following briefly describes the accompanying drawings required for describing the embodiments. Apparently, the accompanying drawings in the following descriptions only show some embodiments of the present disclosure, and a person of ordinary skill in the art may still derive other drawings from these accompanying drawings without creative efforts.

DETAILED DESCRIPTION OF THE EMBODIMENTS

The following clearly and completely describes the technical solutions in embodiments of the present disclosure with reference to the accompanying drawings in embodiments of the present disclosure. Apparently, the described embodiments are merely some but not all of embodiments of the present disclosure. All other embodiments obtained by persons of ordinary skill in the art based on embodiments of the present disclosure shall fall within the protection scope of the present disclosure.

Terms used in embodiments of the present disclosure are merely intended to describe particular embodiments but are not intended to limit the present disclosure. The singular forms of "a/an", "said", and "the" used in embodiments of the present disclosure and the appended claims are also intended to include plural forms, unless the context clearly implies otherwise.

It should be understood that, the term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects before and after. In addition, the term "based on" used in this specification is not limited to being based on an object only. For example, determining B based on A may indicate: determining B based on A only, or determining B partially based on A.

In a related technology, stacking is performed on an upper stacking object and a lower stacking object based on a pose of the lower stacking object relative to material handling equipment, and impacts of factors such as an inaccurate pickup pose of the upper stacking object, uneven ground, a cumulative error of an odometer, and an error of the material handling equipment are not considered. As a result, the upper stacking object and the lower stacking object are not aligned during stacking, which affects operation safety.

Figure 1:
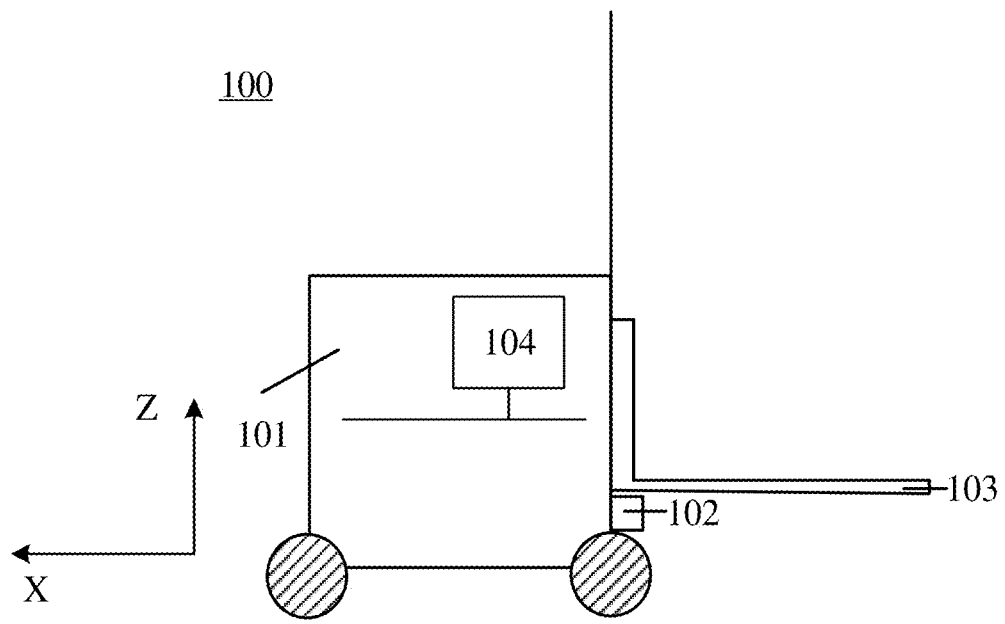
FIG. 1 is a schematic diagram of a system for material handling equipment to which embodiments of the present disclosure are applicable.

In view of this, the present disclosure provides a new idea. To facilitate understanding of the present disclosure, the following first describes a schematic diagram of a system for material handling equipment on which the present disclosure is based. FIG. 1 shows a schematic diagram of a system for material handling equipment to which embodiments of the present disclosure may be applied. As shown in FIG. 1, the material handling equipment 100 includes a material handling equipment body 101, a sensor 102, a stacking execution component 103, and a controller 104. For example, the controller 104 may include a memory and a processor. The memory is used to store program instructions, and the controller is used to execute the program instructions, to implement a method in embodiments of the present disclosure.

At the hardware level, the controller 104 generally includes a processor and a memory. Optionally, the controller 104 may also include input and output interfaces, a mainboard, peripheral circuits and elements. At the software level, the controller 104 generally includes a control algorithm, an operating system, a communication protocol, and so on. The controller 104 in the specification may be referred to as a collection of controllers for performing the same or different tasks.

The material handling equipment 100 in embodiments of the present disclosure refers to a device that may automatically or semi-automatically perform a handling task. The material handling equipment 100 may be an Automated Guided Forklift (AGF), a pallet truck, a crane truck, an Automated Guided Vehicle (AGV), an Autonomous Mobile Robot (AMR), a humanoid robot, or the like. The corresponding stacking execution component 103 may be a fork, a robotic arm, or the like.

The AGF is an intelligent industrial vehicle that integrates a forklift technology and an AGV (Automated Guided Vehicle) technology. The AGF can automatically complete tasks such as material handling and stacking.

The controller 104 is configured to control the stacking execution component 103 of the material handling equipment 100 to execute stacking on a first stacking object and a second stacking object. The controller 104 may be a system or a device on the material handling equipment body 101 that plays a role of computation or control, such as a control mainboard, a control box, a control unit, a vehicle-mounted computer, a computing platform, a tablet computer, or a computer, or a system or a device that plays a role of computation or control in a local server or a cloud server, or may be in another form, such as a handheld controller or a remote controller. This is not limited in embodiments of the present disclosure.

The sensor 102 may be in a form of a sensor module. The sensor 102 may be a visual sensor used for collecting image data, such as a camera. The camera may be mounted on the stacking execution component 103, thereby facilitating collection of image data.

The memory 105 in the controller 104 is further configured to store data collected by the sensor 102, such as image data.

The processor is responsible for executing core functions such as calculation, control and decision-making. The processor may receive data from a sensor, run control algorithms, and command an actuator to complete a task. Common processor types may include: a CPU (Central Processing Unit), a DSP (Digital Signal Processor), a MCU (Microcontroller Unit), and so on. The processor in the specification may refer to a collection of processors for performing the same or different tasks.

The memory is configured to store data or a program. The memory in the specification may be referred to as a collection of memories for performing the same or different tasks.

First, concepts involved in embodiments of the present disclosure are described.

Stacking refers to arranging and piling up some objects vertically according to a specific rule.

Stacking object: refers to an object involved in stacking, and may be specifically goods or goods with a simple package such as a wrapping film, or may be a container that may accommodate or carry goods, for example, a material cage, a wooden box, a plastic box, or a pallet.

Stacking process: refers to a process in which material handling equipment lifts a first stacking object to make the first stacking object move close to a second stacking object, adjusts a pose of the material handling equipment to align the first stacking object with the second stacking object, and places the first stacking object onto the second stacking object, to complete stacking.

The first stacking object refers to a stacking object located above, and the second stacking object refers to a stacking object located below.

Alignment state: refers to a state in which two or more stacking objects are arranged in a vertical direction, and at least some of border straight lines of a stacking object are parallel to or overlapped with those of another stacking object. The vertical direction refers to a Z-axis direction in a coordinate system of material handling equipment (for example, the Z-axis in FIG. 2). The three-dimensional coordinate system in FIG. 2 consists of the origin O, the X-axis, the Y-axis, and the Z-axis, and the coordinate axes are mutually perpendicular and intersect each other pairwise. Optionally, a geometric center point of the material handling equipment may be used as the point O, and a forward-backward travel direction (that is, a longitudinal direction of the material handling equipment body 101) of the material handling equipment is used as the X-axis, where a positive direction of the X-axis is a direction away from an attachment (for example, a fork) of the material handling equipment, a lateral direction of the material handling equipment body 101 is used as the Y-axis, and a height direction of the material handling equipment is used as the Z-axis.

In FIG. 1, the X corresponds to the X-axis in the three-dimensional coordinate system, the O corresponds to the origin O in the three-dimensional coordinate system, the Z corresponds to the Z-axis in the three-dimensional coordinate system, and the Y corresponds to the Y-axis in the three-dimensional coordinate system, where a positive direction of the Y-axis is perpendicular to the paper, pointing outwards (not shown in the figure).

The first stacking object has a first target region. The first target region refers to a specific region on the first stacking object for detection and analysis, for example, the first target region at least includes a key structure region of the first stacking object, such as a foot cup.

Optionally, the first stacking object is a first material cage. The first target region may include at least a partial region of a first foot cup of the first material cage and at least a partial region of a third foot cup of the first material cage. Optionally, the first target region further includes at least a partial region of a fifth foot cup of the first material cage and at least a partial region of a seventh foot cup of the first material cage.

A foot cup of a material cage refers to a support component installed at a bottom of a material cage, and is generally used to stabilize the material cage, bear a weight, and protect the material cage against direct contact with the ground. In industrial, warehousing, and logistics scenarios, a material cage (also referred to as a returnable cage or warehouse cage) is often equipped with foot cups, to implement better mobility, stacking, and durability.

The second stacking object has a second target region. The second target region refers to a specific region on the second stacking object for detection and analysis, for example, the second target region at least includes a key structure region of the second stacking object, such as an upright.

Optionally, the second stacking object is a second material cage. The second target region may include at least a partial region of a second upright of the second material cage and at least a partial region of a fourth upright of the second material cage. Optionally, the second target image region further includes at least a partial region of a sixth upright of the second material cage and at least a partial region of an eighth upright of the second material cage.

Uprights of a material cage refer to vertical support structures around the material cage, and are generally used to bear a weight of the material cage, fix a frame structure of a cage body, and provide a stacking function. An upright is one of core components of the material cage, and design of the upright directly affects strength, stability, and use functions of the material cage.

Target image: refers to image data acquired by a sensor, and at least includes a first target image region and a second target image region. The first target image region corresponds to image data of a first target region, and the second target image region corresponds to image data of a second target region.

Pixel: refers to a basic unit of an image and represents a point in the image, and each pixel includes position information.

Pixel difference: refers to a positional difference between two pixels in an image.

Control quantity: refers to a moving distance, a rotational angular velocity, a speed, a rotation angle, a displacement amount, or the like of a vehicle body or a component of material handling equipment.

Figure 3:
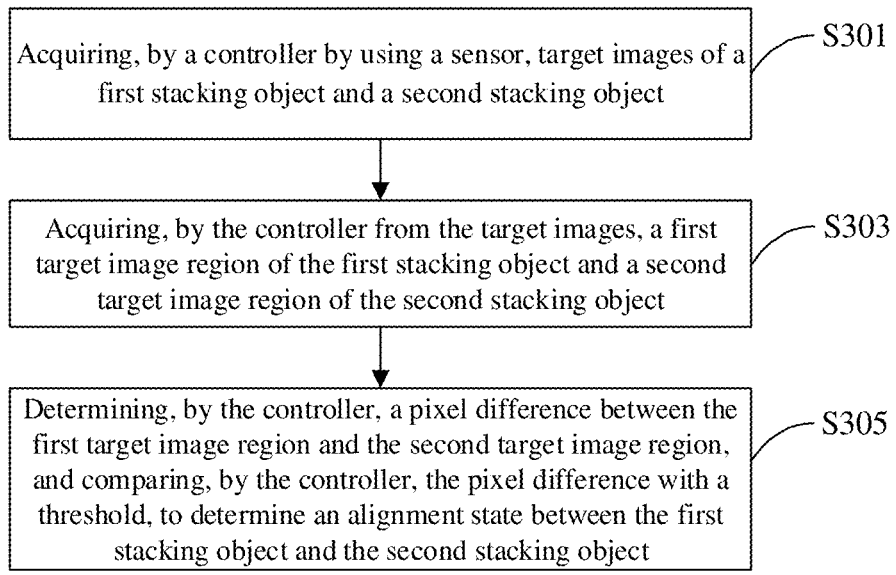
FIG. 3 is a schematic flowchart of a method for determining an alignment state according to an embodiment of the present disclosure.

FIG. 3 is a schematic flowchart of method for determining an alignment state according to an embodiment of the present disclosure. The method may be executed by a controller in the material handling equipment in the system shown in FIG. 1. As shown in FIG. 3, the method may include Step S301 to Step S305.

Step S301: Acquiring, by a controller by using a sensor, target images of a first stacking object and a second stacking object.

Step S303: Acquiring, by the controller from the target images, a first target image region of the first stacking object and a second target image region of the second stacking object.

Step S305: Determining, by the controller, a pixel difference between the first target image region and the second target image region, and comparing, by the controller, the pixel difference with a threshold, to determine an alignment state between the first stacking object and the second stacking object.

It may be learned from the foregoing procedure that, in the present disclosure, the alignment state between the first stacking object and the second stacking object is determined based on the pixel difference between the first target image region of the first stacking object and the second target image region of the second stacking object. By using this solution, impacts of an external environment (for example, uneven ground) and an error of material handling equipment may be prevented, and pose data of a first stacking object and a second stacking object may be accurately calculated, thereby determining an alignment state between the first stacking object and the second stacking object.

With reference to the embodiments, the following describes in detail steps in the foregoing procedure and effects that can be further generated. It should be noted that terms such as "first" and "second" in the present disclosure do not have limitations on a size, a sequence, a quantity, or the like, but are merely used to distinguish between names. For example, "first stacking object" and "second stacking object" are used to distinguish between two objects.

First, with reference to an embodiment, the following describes in detail Step S301, that is, "acquiring, by the controller by using the sensor, the target images of the first stacking object and the second stacking object".

Figure 4:
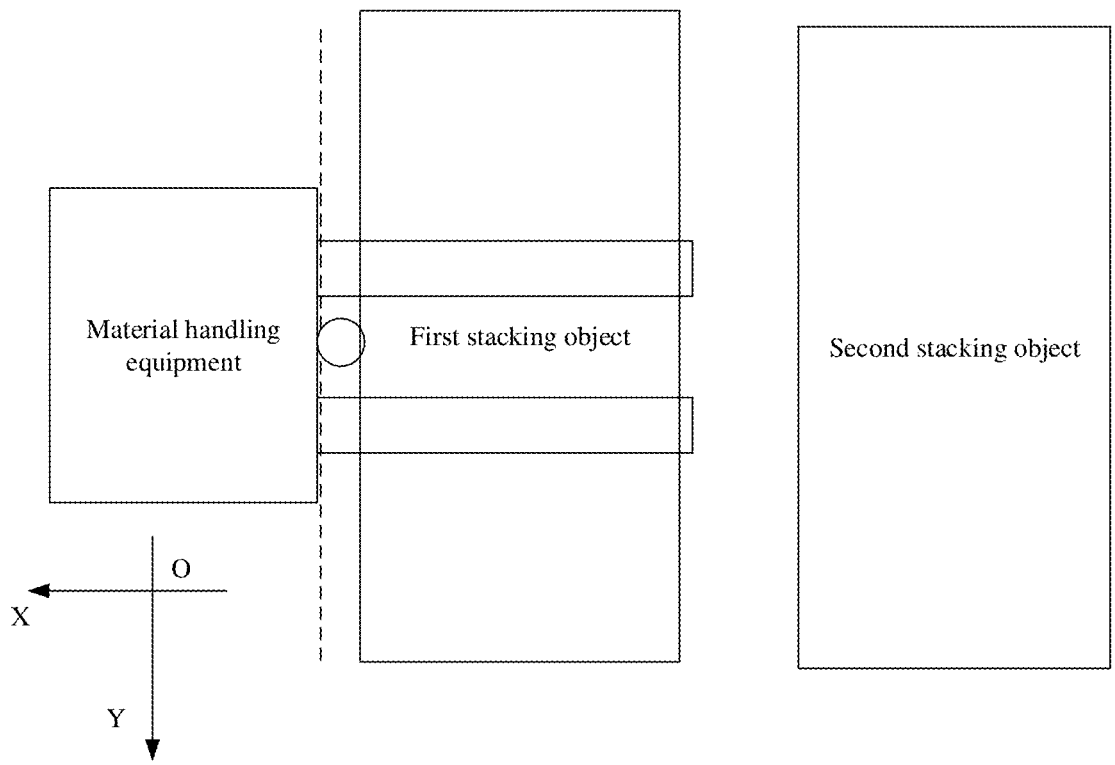
FIG. 4 is a schematic diagram of a layout of one camera on material handling equipment.
Figure 5:
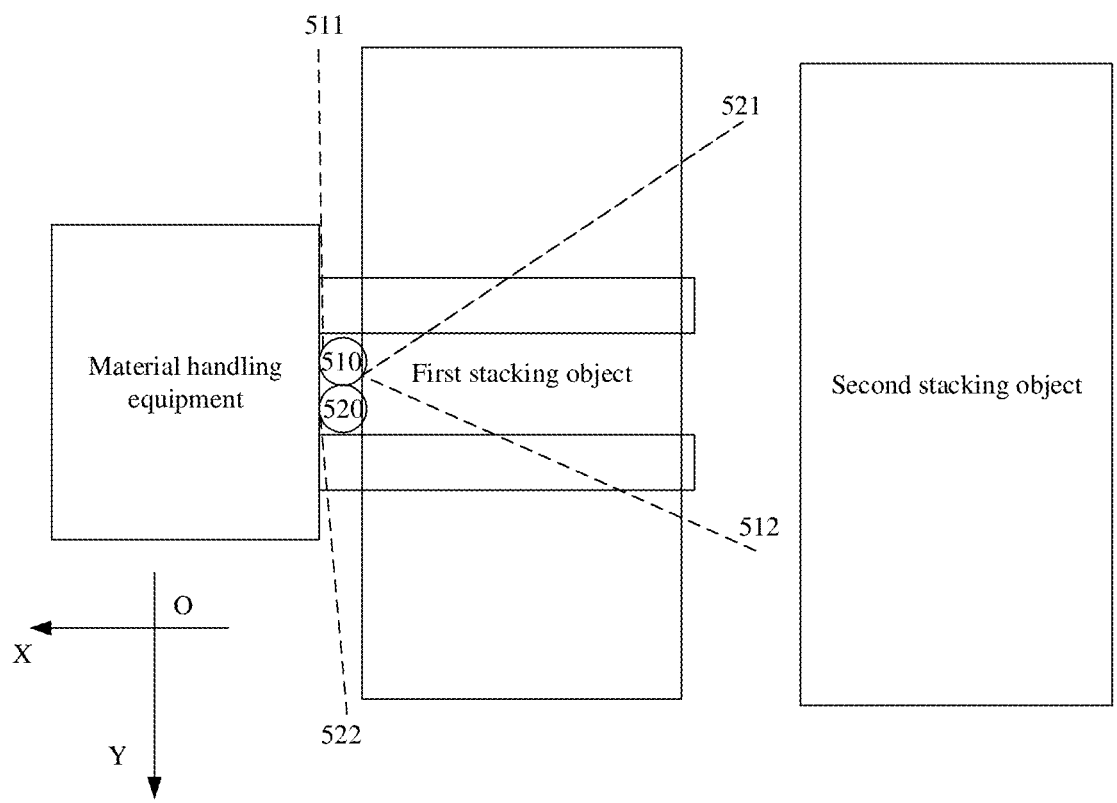
FIG. 5 is a schematic diagram of a layout of two cameras on material handling equipment.

First, a stacking scenario involved in this embodiment of the present disclosure is briefly described. As shown in FIG. 4 and FIG. 5, after the material handling equipment receives a handling task of stacking the first stacking object onto the second stacking object, the controller (for example, the controller 104 shown in FIG. 1) controls a fork of the material handling equipment to pick up the first stacking object, controls the material handling equipment to move near the second stacking object, vertically aligns the first stacking object with the second stacking object by controlling a pose of the material handling equipment, and stacks the first stacking object onto the second stacking object.

The sensor may be disposed at a preset distance (for example, on a truck body or a fork arm structure) below a midpoint between base ends of fork arms of the material handling equipment, or may be disposed in another position according to an actual condition. An odometer may be disposed near a wheel of the material handling equipment, and is configured to record a quantity of circles of rotation of the wheel, to estimate a moving distance. Alternatively, the odometer may also be disposed in a center of a chassis of the material handling equipment.

The odometer estimates the moving distance of the material handling equipment by measuring motion of the material handling equipment. Generally, a physical quantity such as a position, a speed, or a pose of the material handling equipment is calculated with reference to data collected by the sensor.

For example, the sensor and the odometer may be controlled by a controller (for example, the controller 104 in FIG. 1) built in the material handling equipment, for example, may be controlled based on a SoC (System-on-a-Chip). This is not specifically limited in embodiments of the present disclosure.

Before pose adjustment information of the material handling equipment is determined, it is also necessary to synchronize the odometer with the sensor in terms of time. For example, the sensor may use PTP (Precision Time Protocol) or hardware trigger synchronization.

In FIG. 4, the first stacking object is placed on a fork of the material handling equipment, and the number of the second stacking objects is at least one. When there are a plurality of second stacking objects, the first stacking object is placed by the material handling equipment on a second stacking object that is located at the uppermost layer among the plurality of second stacking objects.

In this embodiment of the present disclosure, when the material handling equipment moves the first stacking object to a stacking operation position, and lifts the first stacking object above a stacking height, and the sensor can capture target regions of the first stacking object and the second stacking object, the sensor acquires target images of the first stacking object and the second stacking object.

Herein, the stacking operation position may be a position in which the sensor on the material handling equipment can acquire target region images of both the first stacking object and the second stacking object. In this position, a fork of the material handling equipment can stack the first stacking object and the second stacking object within a variable pose range of the fork. For example, a position within a preset distance range in front of the second stacking object is used as the stacking operation position according to a position of the second stacking object.

The sensors involved in this embodiment of the present disclosure may include a camera module, where the camera module may include one or more cameras. The following uses the camera as an example for description. The camera may be installed at a preset distance below a midpoint between base ends of a stacking execution component (for example, a fork) of the material handling equipment, so that a field of view of the camera can cover the target regions of both the first stacking object and the second stacking object, respectively.

In this embodiment of the present disclosure, a layout of the camera is determined based on a size of a stacking object and a field-of-view parameter of the camera. The layout is used to represent the number and/or orientation of the cameras, so that the field of view of each camera can cover the target regions of both the first stacking object and the second stacking object.

In this embodiment of the present disclosure, the layout of the camera is adjusted, so that the field of view of each camera can cover at least one foot cup of the first stacking object and at least one upright of the second stacking object.

Compared with a traditional implementation that relies on a laser sensor or a TOF (Time of Flight) camera to acquire a point cloud or a depth map for pose calculation, a fisheye camera or a RGB camera may be used in this embodiment of the present disclosure, to acquire the target images. Costs of the laser sensor and the TOF camera are relatively high, the point cloud acquired by the laser sensor is sparse and lacks color information, and a FOV (Field of View) of the TOF camera is relatively small. The fisheye camera and the RGB camera provide a wider field of view, and are more cost-effective.

If one camera is provided, the one camera may be disposed between base ends of fork arms.

Taking a fisheye camera as an example below, in an example, the acquiring, by the controller by using the sensor, the target images of the first stacking object and the second stacking object includes: capturing, by the fisheye camera, the first stacking object and the second stacking object, to acquire the target images of the first stacking object and the second stacking object.

In FIG. 4, a field of view of the fisheye camera is indicated by two dashed lines. The fisheye camera can capture all foot cups of the first stacking object and all uprights of the second stacking object within its view.

If two cameras are disposed, the two cameras may be respectively disposed at two ends (for example, a first end and a second end) between base ends of fork arms. Lenses of the two cameras are oriented towards each other. The camera located at the first end is directed towards a position of the camera located at the second end, and the camera located at the second end is directed towards a position of the camera located at the first end.

Taking a RGB camera as an example below, in an example, the acquiring, by the controller by using the sensor, the target images of the first stacking object and the second stacking object includes: capturing, by a first RGB camera with a first orientation, the first stacking object and the second stacking object, to acquire a first image, and controlling a second RGB camera with a second orientation to capture the first stacking object and the second stacking object, to acquire a second image, the first orientation and the second orientation being distinct from each other, and the target images including the first image and the second image.

Figure 2:
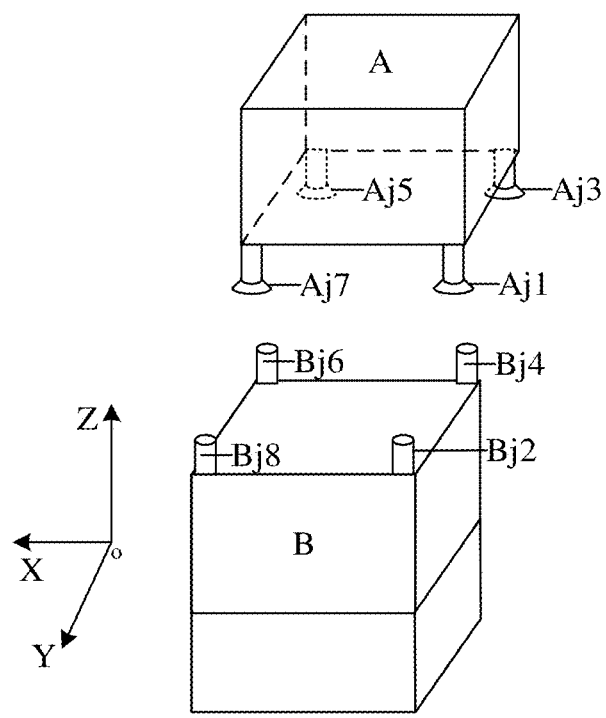
FIG. 2 is a schematic diagram of a region where a first stacking object and a second stacking object are aligned.

As shown in FIG. 5, referring to a layout of foot cups and uprights in FIG. 2, a field of view of the first camera 510 is indicated by dashed lines 511 and 512. The first camera can acquire a fifth foot cup and a third foot cup of the first stacking object, and a sixth upright and a fourth upright of the second stacking object within its view through capturing. The fifth foot cup and the third foot cup are located on a first side of the first stacking object, and the sixth upright and the fourth upright are located on a first side of the second stacking object. A field of view of the second camera 520 is indicated by dashed lines 521 and 522. The second camera can acquire a first foot cup and a seventh foot cup of the first stacking object, and a second upright and an eighth upright of the second stacking object within its view through capturing. The first foot cup and the seventh foot cup are located on a second side of the first stacking object, and the second upright and the eighth upright are located on a second side of the second stacking object.

Considering that distortions may exist in the images acquired when both the first stacking object and the second stacking object are captured separately by the cameras, in this embodiment of the present disclosure, the acquiring, by the controller by using the sensor, the target images of the first stacking object and the second stacking object further includes: acquiring, by the controller by using the sensor, original images of the first stacking object and the second stacking object; and performing, by the controller based on a pre-calibrated camera intrinsic parameter, distortion correction on the original images, to acquire the target images.

An image distortion is mainly caused by optical characteristics of a lens of a camera. When light pass through the lens, a radial distortion and a tangential distortion may be generated due to limitations of refraction and manufacturing processes. The radial distortion causes a straight line in an image to appear curved, and the more distant a pixel from a center of the image, the more serious the distortion. The tangential distortion is caused by the fact that the lens and photosensitive elements are not completely parallel. Therefore, the distortion correction is performed on the original images based on the pre-calibrated camera intrinsic parameter, to acquire the undistorted images (that is, the target images).

It should be noted that embodiments of the present disclosure may be applied to a scenario with a plurality of stacking objects.

With reference to an embodiment, the following describes in detail Step S303, that is, "acquiring, by the controller from the target images, the first target image region of the first stacking object and the second target image region of the second stacking object".

In this embodiment of the present disclosure, the controller identifies and locates the first target image region of the first stacking object in the target images through a target detection algorithm, and identifies and locates the second target image region of the second stacking object in the target images through the target detection algorithm.

In this embodiment of the present disclosure, the first stacking object is a first material cage. The first target image region at least includes at least a partial region of at least one foot cup. For example, the first target image region may include at least one of at least a partial region of a first foot cup, at least a partial region of a third foot cup, at least a partial region of a fifth foot cup, and at least a partial region of a seventh foot cup. The second target image region includes at least a partial region of at least one upright. For example, second target image region may include at least one of at least a partial region of a second upright, at least a partial region of a fourth upright, at least a partial region of a sixth upright, and at least a partial region of an eighth upright.

The following description of the first target image region and the second target image region is based on an example where the first material cage includes the first foot cup, the third foot cup, the fifth foot cup, and the seventh foot cup, and a second material cage includes the second upright, the fourth upright, the sixth upright, and the eighth upright.

In an example, the first target image region includes at least a partial region of the first foot cup of the first material cage. The second stacking object is the second material cage, and the second target image region includes at least a partial region of the second upright of the second material cage.

Figure 6:
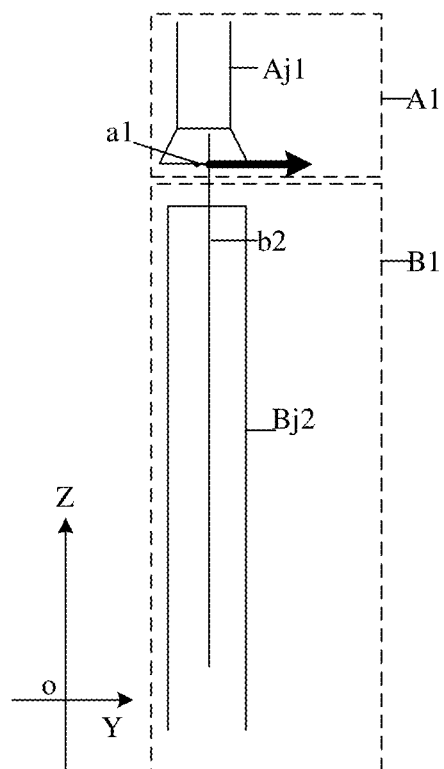
FIG. 6 to FIG. 18 are schematic diagrams of determining a pixel difference.

In FIG. 6, the first target image region A1 includes at least a partial region of the first foot cup Aj1, and the second target image region B1 includes at least a partial region of the second upright Bj2.

In an example, the first target image region includes at least a partial region of the first foot cup of the first material cage and at least a partial region of the third foot cup of the first material cage, and the second target image region includes at least a partial region of the second upright of the second material cage and at least a partial region of the fourth upright of the second material cage.

In FIG. 7, FIG. 9, FIG. 11, FIG. 12, FIG. 14, FIG. 15, FIG. 16, and FIG. 17, the first target image region A1 includes at least a partial region of the first foot cup Aj1 and at least a partial region of the third foot cup Aj3, and the second target image region B1 includes at least a partial region of the second upright Bj2 and at least a partial region of the fourth upright Bj4.

In an example, the first target image region includes at least a partial region of the first foot cup of the first material cage, at least a partial region of the third foot cup of the first material cage, and at least a partial region of the fifth foot cup of the first material cage; and the second target image region includes at least a partial region of the second upright of the second material cage, at least a partial region of the fourth upright of the second material cage, and at least a partial region of the sixth upright of the second material cage.

In an example, the first target image region includes at least a partial region of the first foot cup of the first material cage, at least a partial region of the third foot cup of the first material cage, at least a partial region of the fifth foot cup of the first material cage, and at least a partial region of the seventh foot cup of the first material cage; and the second target image region includes at least a partial region of the second upright of the second material cage, at least a partial region of the fourth upright of the second material cage, at least a partial region of the sixth upright of the second material cage, and at least a partial region of the eighth upright of the second material cage.

In FIG. 8, FIG. 10, FIG. 13, and FIG. 18, the first target image region A1 includes at least a partial region of the first foot cup Aj1, at least a partial region of the third foot cup Aj3, at least a partial region of the fifth foot cup Aj5, and at least a partial region of the seventh foot cup Aj7; and the second target image region B1 includes at least a partial region of the second upright Bj2, at least a partial region of the fourth upright Bj4, at least a partial region of the sixth upright Bj6, and at least a partial region of the eighth upright Bj8.

At least a partial region may at least include a part or all of the region. Taking the first foot cup as an example, the first target image region at least includes a part or all of the first foot cup. Taking the second upright as an example, the second target image region at least includes a part or all of the second upright.

With reference to an embodiment, the following describes in detail Step S305, that is, "determining, by the controller, the pixel difference between the first target image region and the second target image region, and comparing, by the controller, the pixel difference with the threshold, to determine the alignment state between the first stacking object and the second stacking object".

In a first manner, the controller uses a first pixel relationship vector between a first center point in the first target image region and a second center line in the second target image region as a first pixel difference.

When the first pixel difference is less than the threshold, the controller determines that a first foot cup of the first stacking object is aligned with a second upright of the second stacking object, to determine that the first stacking object is aligned with the second stacking object.

The first pixel relationship vector is a vertical vector from the first center point to the second center line in the second target image region. Herein, the vertical vector is generated based on a direction of a vertical line from coordinates of the first center point to the second center line in the second target image region.

In an example, the first stacking object is a first material cage, and the first center point in the first target image region is a center vertex of a first foot cup of the first material cage. The second stacking object is a second material cage, and the second center line in the second target image region is a center line of a second upright of the second material cage.

The central vertex of the first foot cup may refer to a center point of a surface (that is, a surface facing a top region of the second material cage) of the first foot cup.

The center line of the second upright may refer to a virtual line that passes through geometric center points of a columnar structure (that is, the second upright), and the virtual line may represent a symmetry axis of the second upright.

As shown in FIG. 6, the center vertex of the first foot cup and the center line of the second upright are used as an example for description.

In FIG. 6, the first target image region A1 includes at least a partial region of a first foot cup Aj1, and the first center point in the first target image region A1 includes a center vertex a1 of the first foot cup Aj1. The second target image region B1 includes at least a partial region of a second upright Bj2, and the second center line in the second target image region B1 includes a center line b2 of the second upright Bj2. The vertical vector is generated based on a direction of a vertical line (that is, a straight line between a1 and b2 in FIG. 6) from coordinates (x1, y1, z1) of the center vertex a1 of the first foot cup Aj1 to the center line B2 of the second upright Bj2. A direction of the vertical vector is indicated by an arrow pointing from a1 to b2.

In an example, the first center point in the first target image region may also be a geometric center point of a first foot cup of a first material cage.

The geometric center point of the first foot cup may refer to an intersection point of all hyperplanes that divide the first foot cup into two geometrically equal parts.

In a second manner, the controller uses a first pixel relationship vector between a first center point in the first target image region and a second center line in the second target image region as a first pixel difference, and the controller uses a second pixel relationship vector between a third center point in the first target image region and a fourth center line in the second target image region as a second pixel difference.

When the first pixel difference is less than the threshold, the controller determines that a first foot cup of the first stacking object is aligned with a second upright of the second stacking object; and when the second pixel difference is less than the threshold, the controller determines that a third foot cup of the first stacking object is aligned with a fourth upright of the second stacking object. In this way, it is determined that the first stacking object is aligned with the second stacking object.

A manner of generating the second pixel relationship vector is similar to the manner of generating the first pixel relationship vector.

Figure 7:
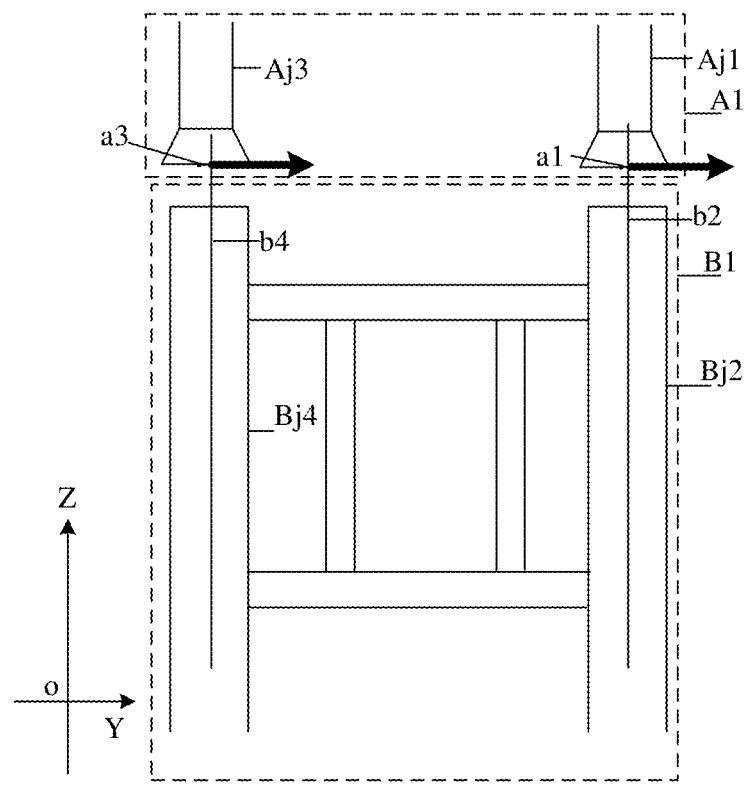

In FIG. 7, the first target image region A1 includes at least a partial region of a first foot cup Aj1 and at least a partial region of a third foot cup Aj3, and the first target image region A1 includes a center vertex a1 of the first foot cup Aj1 and a center vertex a3 of the third foot cup Aj3. The second target image region B1 includes at least a partial region of a second upright Bj2 and at least a partial region of a fourth upright Bj4, and the second target image region B1 includes a center line b2 of the second upright Bj2 and a center line b4 of the fourth upright Bj4. The vertical vector is generated based on a direction of a vertical line (that is, a straight line between a1 and b2 in FIG. 7) from coordinates (x1, y1, z1) of the center vertex a1 of the first foot cup Aj1 to the center line b2 of the second upright Bj2, and a direction of the vertical vector is indicated by an arrow pointing from a1 to b2. The vertical vector is generated based on a direction of a vertical line (that is, a straight line between a3 and b4 in FIG. 7) from coordinates (x3, y3, z3) of the center vertex a3 of the third foot cup Aj3 to the center line b4 of the fourth upright Bj4, and a direction of the vertical vector is indicated by an arrow pointing from a3 to b4.

In an example, the first center point in the first target image region may be a geometric center point of a first foot cup of a first material cage, and the third center point may be a geometric center point of a third foot cup of the first material cage.

Figure 9:
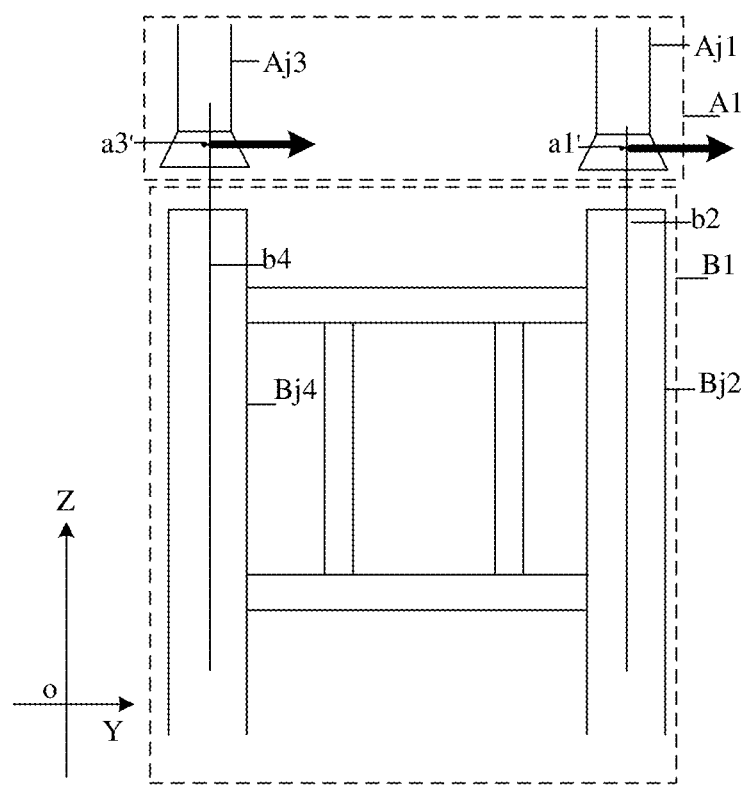

In FIG. 9, the first target image region A1 includes at least a partial region of a first foot cup Aj1 and at least a partial region of a third foot cup Aj3, and the first target image region A1 includes a geometric center point a1' of the first foot cup Aj1 and a geometric center point a3' of the third foot cup Aj3. The second target image region B1 includes at least a partial region of a second upright Bj2 and at least a partial region of a fourth upright Bj4, and the second target image region B1 includes a center line b2 of the second upright Bj2 and a center line b4 of the fourth upright Bj4.

The vertical vector is generated based on a direction of a vertical line (that is, a straight line between a1' and b2 in FIG. 9) from coordinates (x1', y1', z1') of the geometric center point a1' of the first foot cup Aj1 to the center line b2 of the second upright Bj2, and a direction of the vertical vector is indicated by an arrow pointing from a1' to b2. The vertical vector is generated based on a direction of a vertical line (that is, a straight line between a3' and b4 in FIG. 9) from coordinates (x3', y3', z3') of the geometric center point a3' of the third foot cup Aj3 to the center line b4 of the fourth upright Bj4, and a direction of the vertical vector is indicated by an arrow pointing from a3' to b4.

In a third manner, the controller uses a first pixel relationship vector between a first center point in the first target image region and a second center line in the second target image region as a first pixel difference, the controller uses a second pixel relationship vector between a third center point in the first target image region and a fourth center line in the second target image region as a second pixel difference, the controller uses a third pixel relationship vector between a fifth center point in the first target image region and a sixth center line in the second target image region as a third pixel difference, and the controller uses a fourth pixel relationship vector between a seventh center point in the first target image region and an eighth center line in the second target image region as a fourth pixel difference.

When the first pixel difference is less than the threshold, the controller determines that a first foot cup of the first stacking object is aligned with a second upright of the second stacking object. When the second pixel difference is less than the threshold, the controller determines that a third foot cup of the first stacking object is aligned with a fourth upright of the second stacking object. When the third pixel difference is less than the threshold, the controller determines that a fifth foot cup of the first stacking object is aligned with a sixth upright of the second stacking object. When the fourth pixel difference is less than the threshold, the controller determines that a seventh foot cup of the first stacking object is aligned with an eighth upright of the second stacking object. In this way, it is determined that the first stacking object is aligned with the second stacking object.

Manners of generating the second pixel relationship vector, the third pixel relationship vector, and the fourth pixel relationship vector are similar to the manner of generating the first pixel relationship vector.

Figure 8:
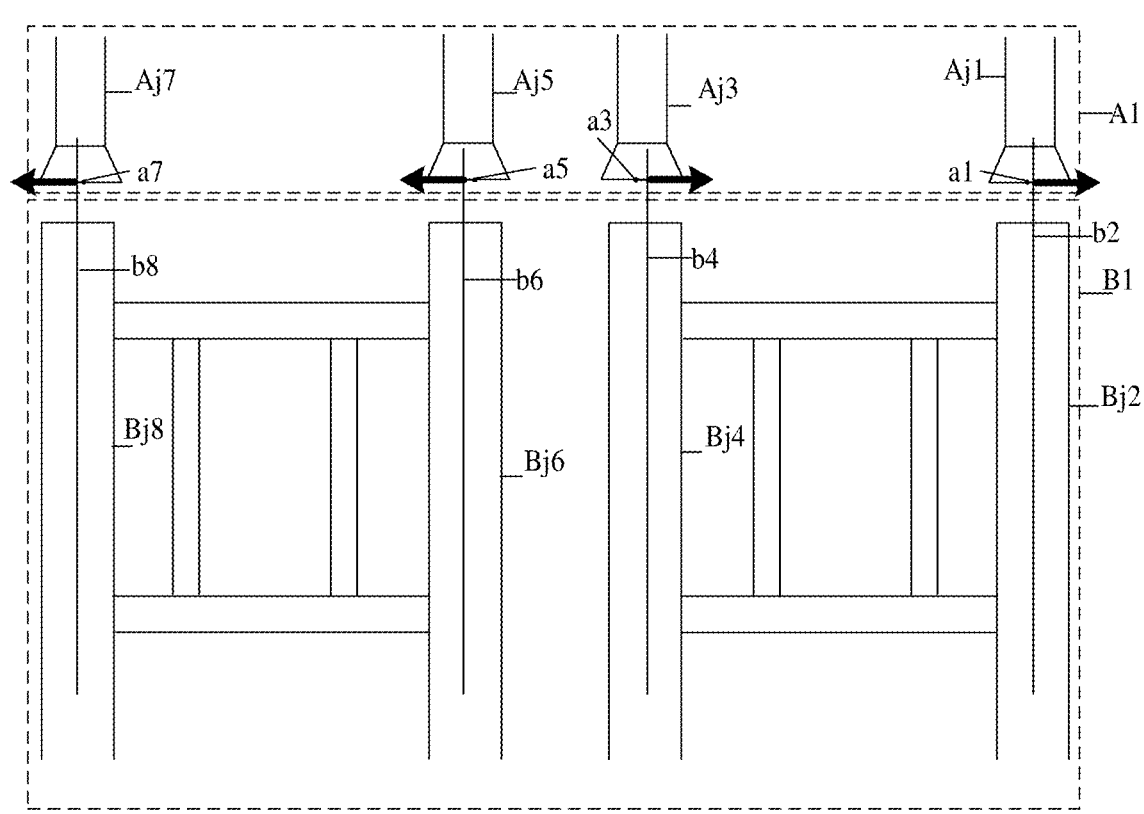

In FIG. 8, the first target image region A1 includes at least a partial region of a first foot cup Aj1, at least a partial region of a third foot cup Aj3, at least a partial region of a fifth foot cup Aj5, and at least a partial region of a seventh foot cup Aj7, and the first center point in the first target image region A1 includes a center vertex a1 of the first foot cup Aj1, a center vertex a3 of the third foot cup Aj3, a center vertex a5 of the fifth foot cup Aj5, and a center vertex a7 of the seventh foot cup Aj7. The second target image region B1 includes at least a partial region of a second upright Bj2, at least a partial region of a fourth upright Bj4, at least a partial region of a sixth upright Bj6, and at least a partial region of an eighth upright Bj8, and the second center line in the second target image region B1 includes a center line b2 of the second upright Bj2, a center line b4 of the fourth upright Bj4, a center line b6 of the sixth upright Bj6, and a center line b8 of the eighth upright Bj8.

The vertical vector is generated based on a direction of a vertical line (that is, a straight line between a1 and b2 in FIG. 8) from coordinates (x1, y1, z1) of the center vertex a1 of the first foot cup Aj1 to the center line b2 of the second upright Bj2, and a direction of the vertical vector is indicated by an arrow pointing from a1 to b2. The vertical vector is generated based on a direction of a vertical line (that is, a straight line between a3 and b4 in FIG. 8) from coordinates (x3, y3, z3) of the center vertex a3 of the third foot cup Aj3 to the center line b4 of the fourth upright Bj4, and a direction of the vertical vector is indicated by and arrow pointing from a3 to b4. The vertical vector is generated based on a direction of a vertical line (that is, a straight line between a5 and b6 in FIG. 8) from coordinates (x5, y5, z5) of the center vertex a5 of the fifth foot cup Aj5 to the center line b6 of the sixth upright Bj6, and a direction of the vertical vector is indicated by an arrow pointing from a5 to b6. The vertical vector is generated based on a direction of a vertical line (that is, a straight line between a7 and b8 in FIG. 8) from coordinates (x7, y7, z7) of the center vertex a7 of the seventh foot cup Aj7 to the center line b8 of the eighth upright Bj8, and a direction of the vertical vector is indicated by an arrow pointing from a7 to b8.

The coordinates of the center vertex a1 of the first foot cup Aj1, the coordinates of the center vertex a3 of the third foot cup Aj3, the coordinates of the center vertex a5 of the fifth foot cup Aj5, and the coordinates of the center vertex a7 of the seventh foot cup Aj7 are coordinates in the three-dimensional coordinate system in FIG. 2.

In an example, the first center point in the first target image region may be a geometric center point of a first foot cup of a first material cage, and the third center point may be a geometric center point of a third foot cup of the first material cage, and the fifth center point may be a geometric center point of a fifth foot cup of the first material cage, and the seventh center point may be a geometric center point of a seventh foot cup of the first material cage.

Figure 10:
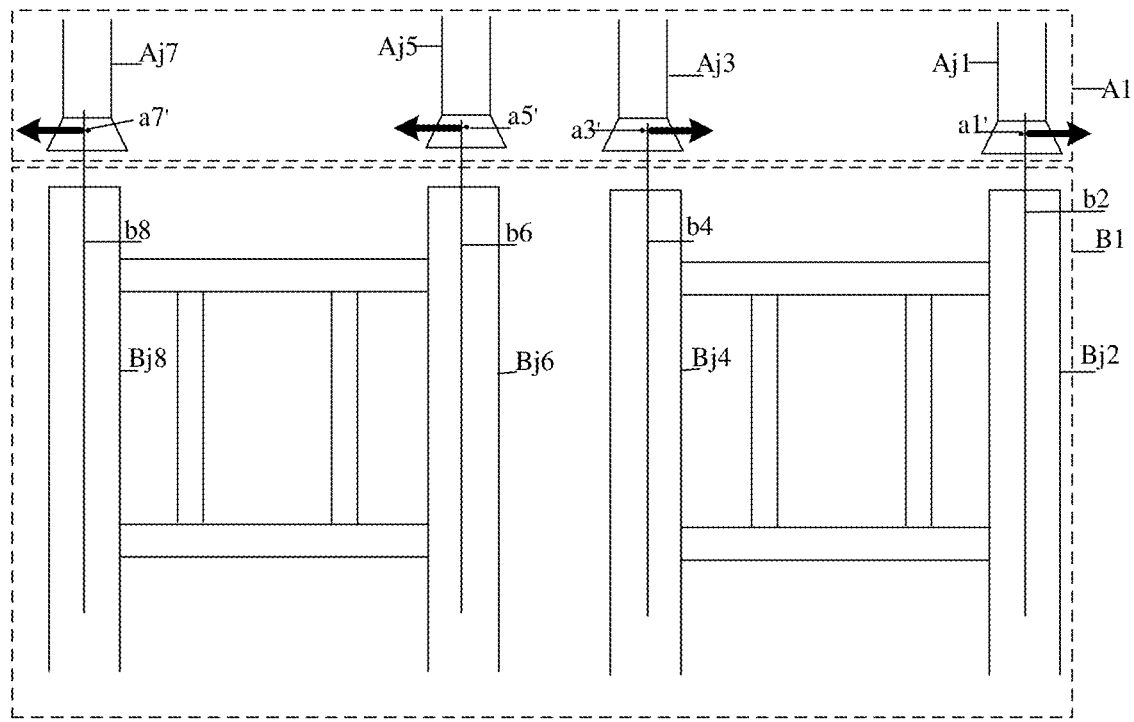

In FIG. 10, the first target image region A1 includes at least a partial region of a first foot cup Aj1, at least a partial region of a third foot cup Aj3, at least a partial region of a fifth foot cup Aj5, and at least a partial region of a seventh foot cup Aj7, and the first target image region A1 includes a geometric center point a1' of the first foot cup Aj1, a geometric center point a3' of the third foot cup Aj3, a geometric center point a5' of the fifth foot cup Aj5, and a geometric center point a7' of the seventh foot cup Aj7. The second target image region B1 includes at least a partial region of a second upright Bj2, at least a partial region of a fourth upright Bj4, at least a partial region of a sixth upright Bj6, and at least a partial region of an eighth upright Bj8, and the second target image region B1 includes a center line b2 of the second upright Bj2, a center line b4 of the fourth upright Bj4, a center line b6 of the sixth upright Bj6, and a center line b8 of the eighth upright Bj8.

The vertical vector is generated based on a direction of a vertical line (that is, a straight line between a1' and b2 in FIG. 10) from coordinates (x1', y1', z1') of the geometric center point a1' of the first foot cup Aj1 to the center line b2 of the second upright Bj2, and a direction of the vertical vector is indicated by an arrow pointing from a1' to b2. The vertical vector is generated based on a direction of a vertical line (that is, a straight line between a3' and b4 in FIG. 10) from coordinates (x3', y3', z3') of the geometric center point a3' of the third foot cup Aj3 to the center line b4 of the fourth upright Bj4, and a direction of the vertical vector is indicated by an arrow pointing from a3' to b4. The vertical vector is generated based on a direction of a vertical line (that is, a straight line between a5' and b6 in FIG. 10) from coordinates (x5', y5', z5') of the geometric center point a5' of the fifth foot cup Aj5 to the center line b6 of the sixth upright Bj6, and a direction of the vertical vector is indicated by an arrow pointing from a5' to b6. The vertical vector is generated based on a direction of a vertical line (that is, a straight line between a7' and b8 in FIG. 10) from coordinates (x7', y7', z7') of the geometric center point a7' of the seventh foot cup Aj7 to the center line b8 of the eighth upright Bj8, and a direction of the vertical vector is indicated by an arrow pointing from a7' to b8.

The coordinates of the geometric center point a1' of the first foot cup Aj1, the coordinates of the geometric center point a3' of the third foot cup Aj3, the coordinates of the geometric center point a5' of the fifth foot cup Aj5, and the coordinates of the geometric center point a7' of the seventh foot cup Aj7 are coordinates in the three-dimensional coordinate system in FIG. 2.

In a fourth manner, in this embodiment of the present disclosure, the controller uses a first pixel relationship vector between a first center point in the first target image region and a second center point in the second target image region as a first pixel difference.

When the first pixel difference is less than the threshold, the controller determines that a first foot cup of the first stacking object is aligned with a second upright of the second stacking object, to determine that the first stacking object is aligned with the second stacking object.

The first pixel relationship vector is a connection vector from the first center point to the second center point.

Herein, the connection vector is generated based on a direction from the first center point to the second center point according to coordinates of the first center point and coordinates of the second center point.

In an example, the first stacking object is a first material cage, and the first center point in the first target image region is a center vertex of a first foot cup of the first material cage. The second stacking object is a second material cage; and the second center point in the second target image region is a center vertex of a second upright of the second material cage.

The central vertex of the second upright may refer to a center point of a surface (that is, a surface facing a bottom region of the first material cage) of the second upright. The central vertex of the first foot cup may refer to a center point of a surface (that is, a surface facing a top region of the second material cage) of the first foot cup.

In an example, when the first center point in the first target image region is the center vertex of the first foot cup of the first material cage, the second center point in the second target image region may be a geometric center point of the second upright of the second material cage.

In an example, when the first center point in the first target image region may be the geometric center point of the first foot cup of the first material cage, the second center point in the second target image region may be a geometric center point of the second upright of the second material cage.

In an example, when the first center point in the first target image region may be the geometric center point of the first foot cup of the first material cage, the second center point in the second target image region may be a center vertex of the second upright of the second material cage.

In a fifth manner, the controller uses a first pixel relationship vector between a first center point in the first target image region and a second center point in the second target image region as a first pixel difference, and the controller uses a second pixel relationship vector between a third center point in the first target image region and a fourth center point in the second target image region as a second pixel difference.

When the first pixel difference is less than the threshold, the controller determines that a first foot cup of the first stacking object is aligned with a second upright of the second stacking object; and when the second pixel difference is less than the threshold, the controller determines that a third foot cup of the first stacking object is aligned with a fourth upright of the second stacking object. In this way, it is determined that the first stacking object is aligned with the second stacking object.

A manner of generating the second pixel relationship vector is similar to the manner of generating the first pixel relationship vector.

Figure 11:
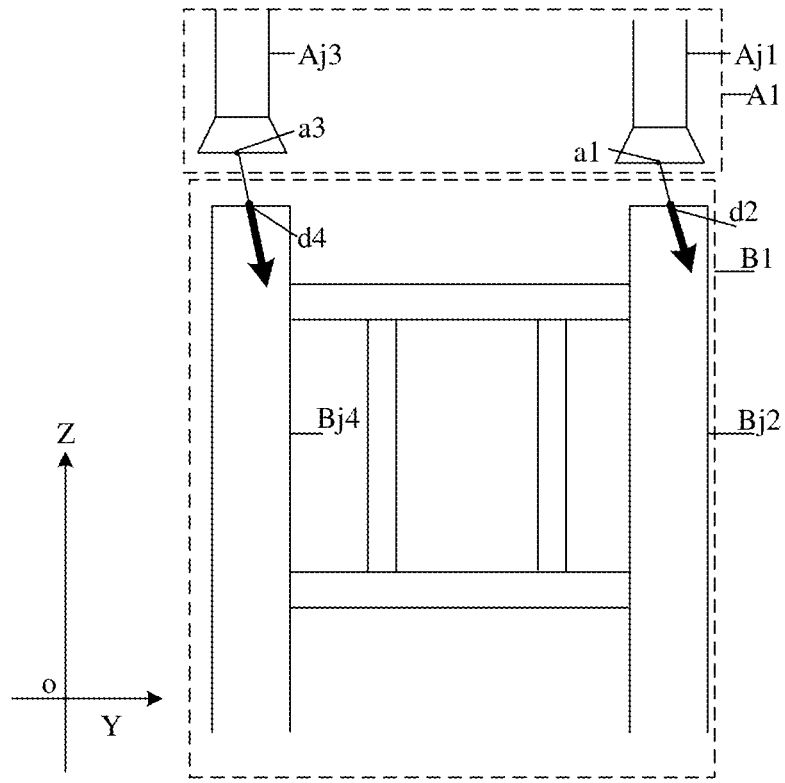

In FIG. 11, the first target image region A1 includes at least a partial region of a first foot cup Aj1 and at least a partial region of a third foot cup Aj3, and the first target image region A1 includes a center vertex a1 of the first foot cup Aj1 and a center vertex a3 of the third foot cup Aj3. The second target image region B1 includes at least a partial region of a second upright Bj2 and at least a partial region of a fourth upright Bj4, and the second target image region B1 includes a center vertex d2 of the second upright Bj2 and a center vertex d4 of the fourth upright Bj4.

The connection vector (that is, a straight line pointing from a1 to d2 in FIG. 11) is generated based on a direction from the center vertex a1 of the first foot cup Aj1 to the center vertex d2 of the second upright Bj2 according to coordinates (x1, y1, z1) of the center vertex a1 of the first foot cup Aj1 and coordinates (x2, y2, z2) of the center vertex d2 of the second upright Bj2. A direction of the connection vector is indicated by an arrow pointing from a1 to d2.

The connection vector (that is, a straight line pointing from a3 to d4 in FIG. 11) is generated based on a direction from the center vertex a3 of the third foot cup Aj3 to the center vertex d4 of the fourth upright Bj4 according to coordinates (x3, y3, z3) of the center vertex a3 of the third foot cup Aj3 and coordinates (x4, y4, z4) of the center vertex d4 of the fourth upright Bj4. A direction of the connection vector is indicated by an arrow pointing from a3 to d4.

The coordinates of the center vertex a1 of the first foot cup Aj1, the coordinates of the center vertex a3 of the third foot cup Aj3, the coordinates of the center vertex d2 of the second upright Bj2, and the coordinates of the center vertex d4 of the fourth upright Bj4 are coordinates in the three-dimensional coordinate system in FIG. 2.

In an example, when the first center point in the first target image region is a center vertex of a first foot cup of a first material cage, and the third center point is a center vertex of a third foot cup of the first material cage, the second center point in the second target image region may be a geometric center point of a second upright of a second material cage, and the fourth center point may be a geometric center point of a fourth upright of the second material cage.

The geometric center point of the second upright may be an intersection point of diagonal lines of a columnar structure in the second target image region, and the geometric center point of the fourth upright may be an intersection point of diagonal lines of a columnar structure in the second target image region.

Figure 12:
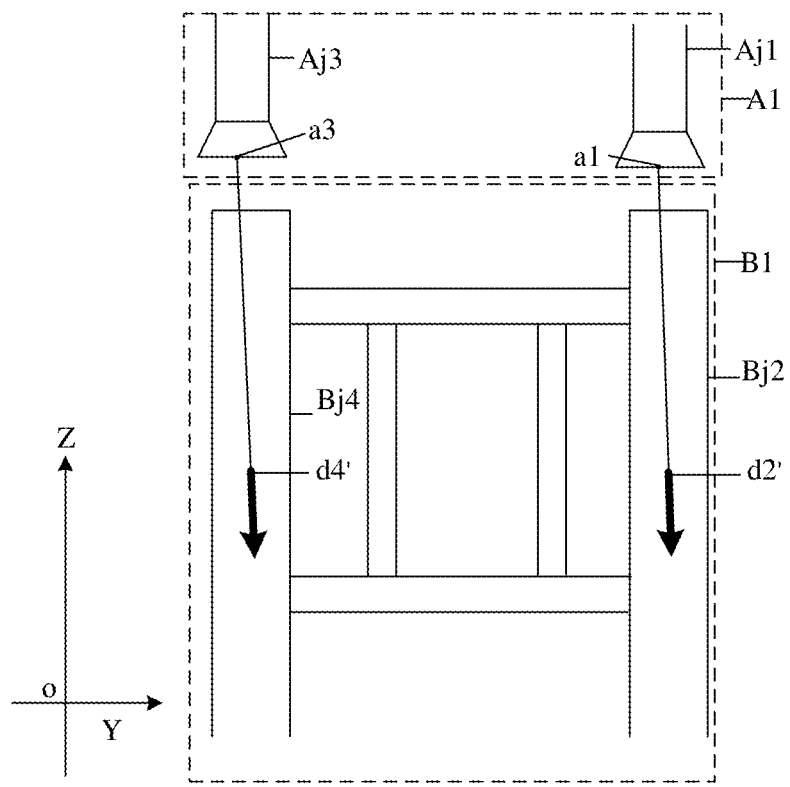

In FIG. 12, the first target image region A1 includes at least a partial region of a first foot cup Aj1 and at least a partial region of a third foot cup Aj3, and the first center point in the first target image region A1 includes a center vertex a1 of the first foot cup Aj1 and a center vertex a3 of the third foot cup Aj3. The second target image region B1 includes at least a partial region of a second upright Bj2 and at least a partial region of a fourth upright Bj4, and the second center point in the second target image region B1 includes a geometric center point d2' of the second upright Bj2 and a geometric center point d4' of the fourth upright Bj4.

The connection vector (that is, a straight line pointing from a1 to d2' in FIG. 12) is generated based on a direction from the center vertex a1 of the first foot cup Aj1 to the geometric center point d2' of the second upright Bj2 according to coordinates (x1, y1, z1) of the center vertex a1 of the first foot cup Aj1 and coordinates (x2', y2', z2') of the geometric center point d2' of the second upright Bj2. A direction of the connection vector is indicated by an arrow pointing from a1 to d2'.

The connection vector (that is, a straight line pointing from a3 to d4' in FIG. 12) is generated based on a direction from the center vertex a3 of the third foot cup Aj3 to the geometric center point d4' of the fourth upright Bj4 according to coordinates (x3, y3, z3) of the center vertex a3 of the third foot cup Aj3 and coordinates (x4', y4', z4') of the geometric center point d4' of the fourth upright Bj4. A direction of the connection vector is indicated by an arrow pointing from a3 to d4'.

In an example, when the first center point in the first target image region is a geometric center point of a first foot cup of a first material cage, and the third center point is a geometric center point of a third foot cup of the first material cage, the second center point in the second target image region may be a geometric center point of a second upright of a second material cage, and the fourth center point may be a geometric center point of a fourth upright of the second material cage.

Figure 14:
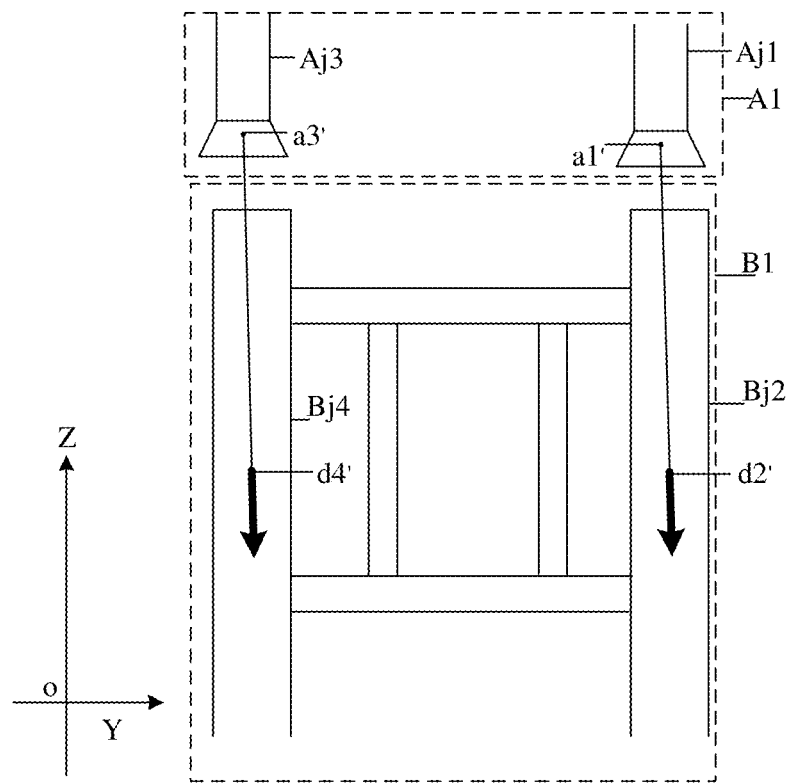

In FIG. 14, the first target image region A1 includes at least a partial region of a first foot cup Aj1 and at least a partial region of a third foot cup Aj3, and the first target image region A1 includes a geometric center point a1' of the first foot cup Aj1 and a geometric center point a3' of the third foot cup Aj3. The second target image region B1 includes at least a partial region of a second upright Bj2 and at least a partial region of a fourth upright Bj4, and the second target image region B1 includes a geometric center point d2' of the second upright Bj2 and a geometric center point d4' of the fourth upright Bj4.

The connection vector (that is, a straight line pointing from a1' to d2' in FIG. 14) is generated based on a direction from the geometric center point a1' of the first foot cup Aj1 to the geometric center point d2' of the second upright Bj2 according to coordinates (x1', y1', z1') of the geometric center point a1' of the first foot cup Aj1 and coordinates (x2', y2', z2') of the geometric center point d2' of the second upright Bj2. A direction of the connection vector is indicated by an arrow pointing from a1' to d2'.

The connection vector (that is, a straight line pointing from a3' to d4' in FIG. 14) is generated based on a direction from the geometric center point a3' of the third foot cup Aj3 to the geometric center point d4' of the fourth upright Bj4 according to coordinates (x3', y3', z3') of the geometric center point a3' of the third foot cup Aj3 and coordinates (x4', y4', z4') of the geometric center point d4' of the fourth upright Bj4. A direction of the connection vector is indicated by an arrow pointing from a3' to d4'.

The coordinates of the geometric center point d2' of the second upright Bj2, and the coordinates of the geometric center point d4' of the fourth upright Bj4 are the coordinates in the three-dimensional coordinate system in FIG. 2.

In an example, when the first center point in the first target image region is a geometric center point of a first foot cup of a first material cage, and the third center point is a geometric center point of a third foot cup of the first material cage, the second center point in the second target image region may be a center vertex of a second upright of a second material cage, and the fourth center point may be a center vertex of a fourth upright of the second material cage.

Figure 15:
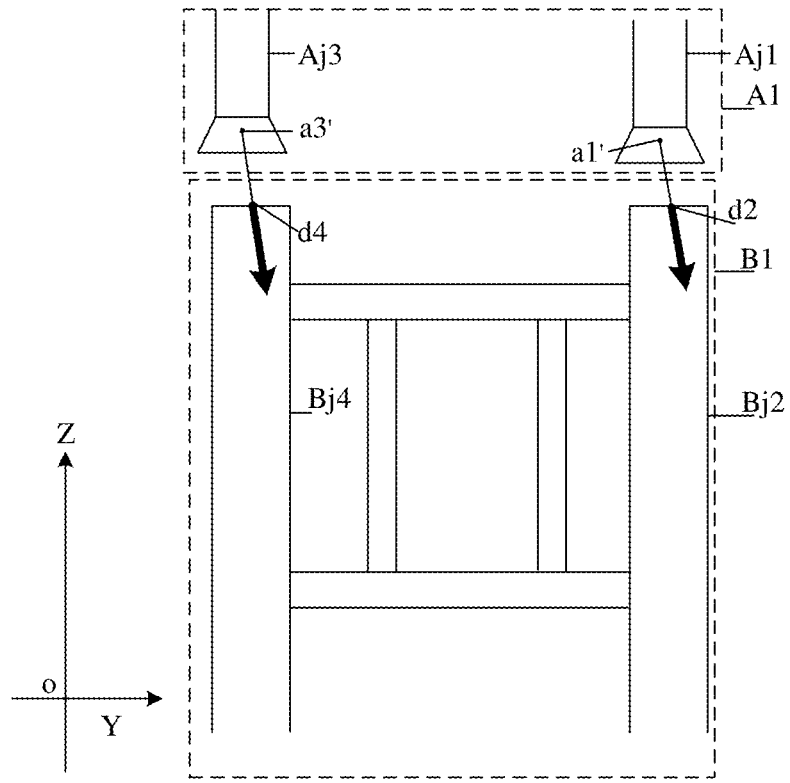

In FIG. 15, the first target image region A1 includes at least a partial region of a first foot cup Aj1 and at least a partial region of a third foot cup Aj3, and the first target image region A1 includes a geometric center point a1' of the first foot cup Aj1 and a geometric center point a3' of the third foot cup Aj3. The second target image region B1 includes at least a partial region of a second upright Bj2 and at least a partial region of a fourth upright Bj4, and the second target image region B1 includes a center vertex d2 of the second upright Bj2 and a center vertex d4 of the fourth upright Bj4.

The connection vector (that is, a straight line pointing from a1' to d2 in FIG. 15) is generated based on a direction from the geometric center point a1' of the first foot cup Aj1 to the center vertex d2 of the second upright Bj2 according to coordinates (x1', y1', z1') of the geometric center point a1' of the first foot cup Aj1 and coordinates (x2, y2, z2) of the center vertex d2 of the second upright Bj2. A direction of the connection vector is indicated by an arrow pointing from a1' to d2.

The connection vector (that is, a straight line pointing from a3' to d4 in FIG. 15) is generated based on a direction from the geometric center point a3' of the third foot cup Aj3 to the center vertex d4 of the fourth upright Bj4 according to coordinates (x3', y3', z3') of the geometric center point a3' of the third foot cup Aj3 and coordinates (x4, y4, z4) of the center vertex d4 of the fourth upright Bj4. A direction of the connection vector is indicated by an arrow pointing from a3' to d4.

The coordinates of the center vertex d2 of the second upright Bj2, and the coordinates of the center vertex d4 of the fourth upright Bj4 are the coordinates in the three-dimensional coordinate system in FIG. 2.

In a sixth manner, the controller uses a first pixel relationship vector between a first center point in the first target image region and a second center point in the second target image region as a first pixel difference, and the controller uses a second pixel relationship vector between a third center point in the first target image region and a fourth center point in the second target image region as a second pixel difference, and the controller uses a third pixel relationship vector between a fifth center point in the first target image region and a sixth center point in the second target image region as a third pixel difference, and the controller uses a fourth pixel relationship vector between a seventh center point in the first target image region and an eighth center point in the second target image region as a fourth pixel difference.

When the first pixel difference is less than the threshold, the controller determines that a first foot cup of the first stacking object is aligned with a second upright of the second stacking object. When the second pixel difference is less than the threshold, the controller determines that a third foot cup of the first stacking object is aligned with a fourth upright of the second stacking object. When the third pixel difference is less than the threshold, the controller determines that a fifth foot cup of the first stacking object is aligned with a sixth upright of the second stacking object. When the fourth pixel difference is less than the threshold, the controller determines that a seventh foot cup of the first stacking object is aligned with an eighth upright of the second stacking object. In this way, it is determined that the first stacking object is aligned with the second stacking object.

Manners of generating the second pixel relationship vector, the third pixel relationship vector, and the fourth pixel relationship vector are similar to the manner of generating the first pixel relationship vector.

Figure 13:
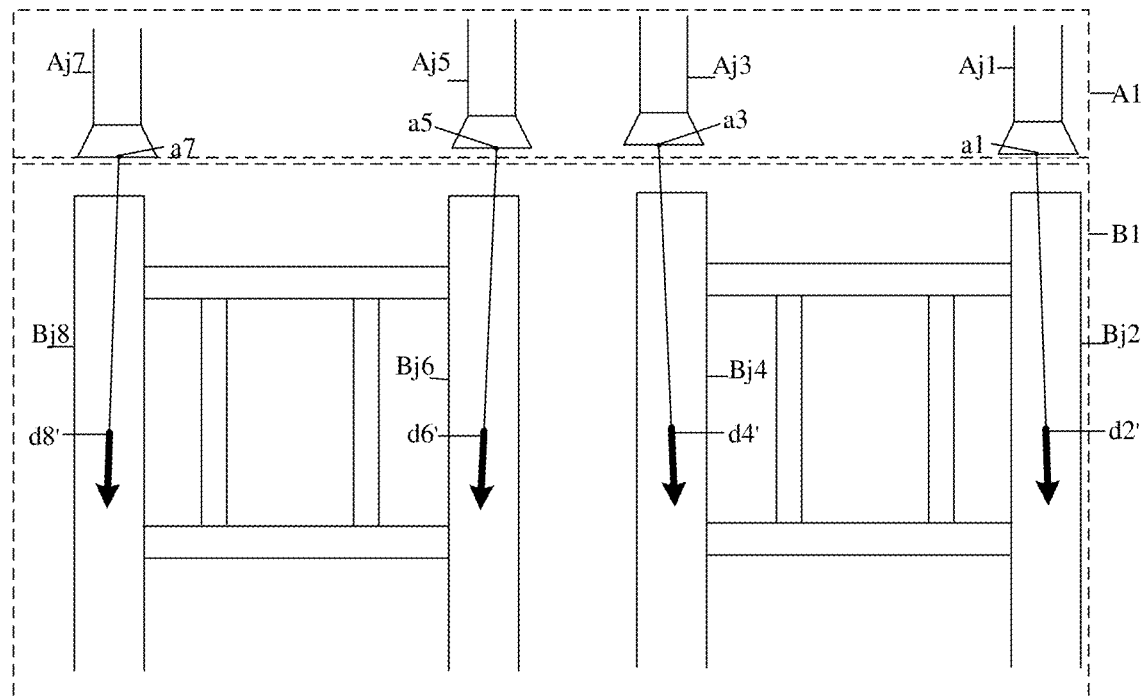

In FIG. 13, the first target image region A1 includes at least a partial region of a first foot cup Aj1, at least a partial region of a third foot cup Aj3, at least a partial region of a fifth foot cup Aj5, and at least a partial region of a seventh foot cup Aj7, and the first target image region A1 includes a center vertex a1 of the first foot cup Aj1, a center vertex a3 of the third foot cup Aj3, a center vertex a5 of the fifth foot cup Aj5, and a center vertex a7 of the seventh foot cup Aj7. The second target image region B1 includes at least a partial region of a second upright Bj2, at least a partial region of a fourth upright Bj4, at least a partial region of a sixth upright Bj6, and at least a partial region of an eighth upright Bj8, and the second target image region B1 includes a geometric center point d2' of the second upright Bj2, a geometric center point d4' of the fourth upright Bj4, a geometric center point d6' of the sixth upright Bj6, and a geometric center point d8' of the eighth upright Bj8.

The connection vector (that is, a straight line pointing from a1 to d2' in FIG. 13) is generated based on a direction from the center vertex a1 of the first foot cup Aj1 to the geometric center point d2' of the second upright Bj2 according to coordinates (x1, y1, z1) of the center vertex a1 of the first foot cup Aj1 and coordinates (x2', y2', z2') of the geometric center point d2' of the second upright Bj2. A direction of the connection vector is indicated by an arrow pointing from a1 to d2'.

The connection vector (that is, a straight line pointing from a3 to d4' in FIG. 13) is generated based on a direction from the center vertex a3 of the third foot cup Aj3 to the geometric center point d4' of the fourth upright Bj4 according to coordinates (x3, y3, z3) of the center vertex a3 of the third foot cup Aj3 and coordinates (x4', y4', z4') of the geometric center point d4' of the fourth upright Bj4. A direction of the connection vector is indicated by an arrow pointing from a3 to d4'.

The connection vector (that is, a straight line pointing from a5 to d6' in FIG. 13) is generated based on a direction from the center vertex a5 of the fifth foot cup Aj5 to the geometric center point d6' of the sixth upright Bj6 according to coordinates (x5, y5, z5) of the center vertex a5 of the fifth foot cup Aj5 and coordinates (x6', y6', z6') of the geometric center point d6' of the sixth upright Bj6. A direction of the connection vector is indicated by an arrow pointing from a5 to d6'.

The connection vector (that is, a straight line pointing from a7 to d8' in FIG. 13) is generated based on a direction from the center vertex a7 of the seventh foot cup Aj7 to the geometric center point d8' of the eighth upright Bj8 according to coordinates (x7, y7, z7) of the center vertex a7 of the seventh foot cup Aj7 and coordinates (x8', y8', z8') of the geometric center point d8' of the eighth upright Bj8. A direction of the connection vector is indicated by an arrow pointing from a7 to d8'.

The coordinates of the geometric center point d2' of the second upright Bj2, and the coordinates of the geometric center point d4' of the fourth upright Bj4 are the coordinates in the three-dimensional coordinate system in FIG. 2.

In an example, when the first center point in the first target image region is the center vertex of the first foot cup of the first material cage, the third center point is the center vertex of the third foot cup of the first material cage, the fifth center point is the center vertex of the fifth foot cup of the first material cage, and the seventh center point is the center vertex of the seventh foot cup of the first material cage, the second center point in the second target image region may be the center vertex of the second upright of the second material cage, the fourth center point may be the center vertex of the fourth upright of the second material cage, the sixth center point may be the center vertex of the sixth upright of the second material cage, and the eighth center point may be the center vertex of the eighth upright of the second material cage.

In an example, when the first center point in the first target image region is the geometric center point of the first foot cup of the first material cage, the third center point is the geometric center point of the third foot cup of the first material cage, the fifth center point is the geometric center point of the fifth foot cup of the first material cage, and the seventh center point is the geometric center point of the seventh foot cup of the first material cage, the second center point in the second target image region may be the geometric center point of the second upright of the second material cage, the fourth center point may be the geometric center point of the fourth upright of the second material cage, the sixth center point may be the geometric center point of the sixth upright of the second material cage, and the eighth center point may be the geometric center point of the eighth upright of the second material cage.

In an example, when the first center point in the first target image region is the geometric center point of the first foot cup of the first material cage, the third center point is the geometric center point of the third foot cup of the first material cage, the fifth center point is the geometric center point of the fifth foot cup of the first material cage, and the seventh center point is the geometric center point of the seventh foot cup of the first material cage, the second center point in the second target image region may be the center vertex of the second upright of the second material cage, the fourth center point may be the center vertex of the fourth upright of the second material cage, the sixth center point may be the center vertex of the sixth upright of the second material cage, and the eighth center point may be the center vertex of the eighth upright of the second material cage.

In a seventh manner, in this embodiment of the present disclosure, the controller uses a first pixel relationship vector between a first center line in the first target image region and a second center point in the second target image region as a first pixel difference. When the first pixel difference is less than the threshold, the controller determines that a first foot cup of the first stacking object is aligned with a second upright of the second stacking object, to determine that the first stacking object is aligned with the second stacking object.

The first pixel relationship vector is a vertical vector from the second center point to the first center line.

Herein, the vertical vector is generated based on a direction of a vertical line from coordinates of the second center point to the first center line.

In an example, the first stacking object is a first material cage, and the first center line is a center line of a first foot cup of the first material cage. The second stacking object is a second material cage, and the second center point is a center vertex of a second upright of the second material cage.

It should be noted that, when the first target image region includes at least a partial region of the first foot cup, the center line of the first foot cup may be a virtual line that passes through geometric center points of a columnar structure (that is, the first foot cup), and the virtual line may represent a symmetry axis of the first foot cup.

In an example, the second center point in the second target image region may also be a geometric center point of the second upright of the second material cage.

In an eighth manner, the controller uses a first pixel relationship vector between a first center line in the first target image region and a second center point in the second target image region as a first pixel difference, and the controller uses a second pixel relationship vector between a third center line in the first target image region and a fourth center point in the second target image region as a second pixel difference.

When the first pixel difference is less than the threshold, the controller determines that a first foot cup of the first stacking object is aligned with a second upright of the second stacking object; and when the second pixel difference is less than the threshold, the controller determines that a third foot cup of the first stacking object is aligned with a fourth upright of the second stacking object. In this way, it is determined that the first stacking object is aligned with the second stacking object.

Figure 16:
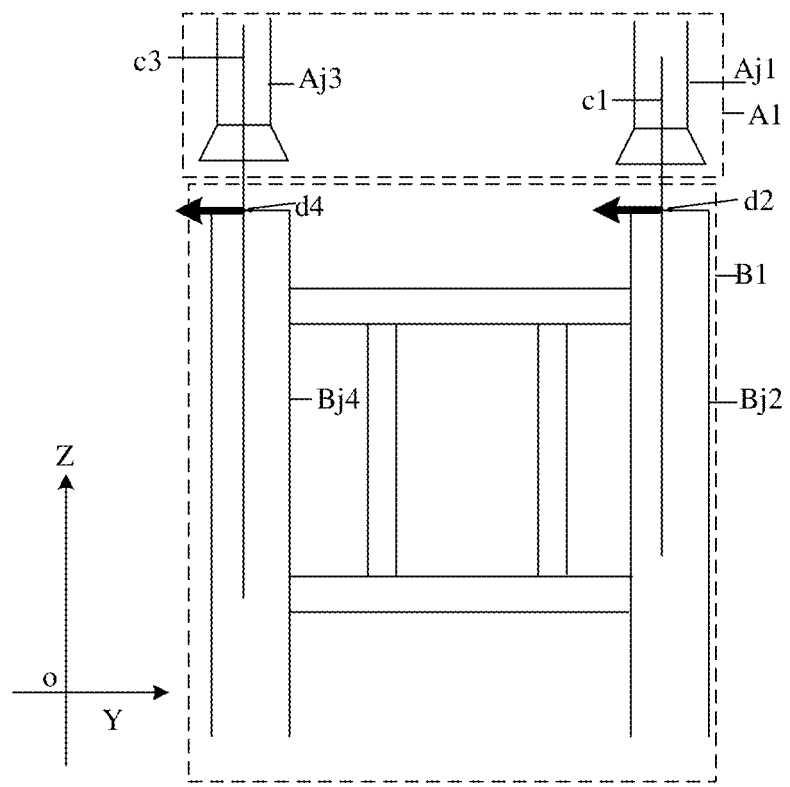

In FIG. 16, the first target image region A1 includes at least a partial region of a first foot cup Aj1 and at least a partial region of a third foot cup Aj3, and the first target image region A1 includes a center line c1 of the first foot cup Aj1 and a center line c3 of the third foot cup Aj3. The second target image region B1 includes at least a partial region of a second upright Bj2 and at least a partial region of a fourth upright Bj4, and the second target image region B1 includes a center vertex d2 of the second upright Bj2 and a center vertex d4 of the fourth upright Bj4.

The vertical vector (that is, a straight line pointing from d2 to c1 in FIG. 16) is generated based on a direction from the center vertex d2 of the second upright Bj2 to the center line c1 of the first foot cup Aj1 according to the center line c1 of the first foot cup Aj1 and coordinates (x2, y2, z2) of the center vertex d2 of the second upright Bj2. A direction of the vertical vector is indicated by an arrow pointing from d2 to c1.

The vertical vector (that is, a straight line pointing from d4 to c3 in FIG. 16) is generated based on a direction from the center vertex d4 of the fourth upright Bj4 to the center line c3 of the third foot cup Aj3 according to the center line c3 of the third foot cup Aj3 and coordinates (x4, y4, z4) of the center vertex d4 of the fourth upright Bj4. A direction of the vertical vector is indicated by an arrow pointing from d4 to c3.

The coordinates of the center vertex d2 of the second upright Bj2 and the coordinates of the center vertex d4 of the fourth upright Bj4 are coordinates in the three-dimensional coordinate system in FIG. 2.

In an example, the second center point in the second target image region may be a geometric center point of a second upright of a second material cage, and the fourth center point may be a geometric center point of a fourth upright of the second material cage.

Figure 17:
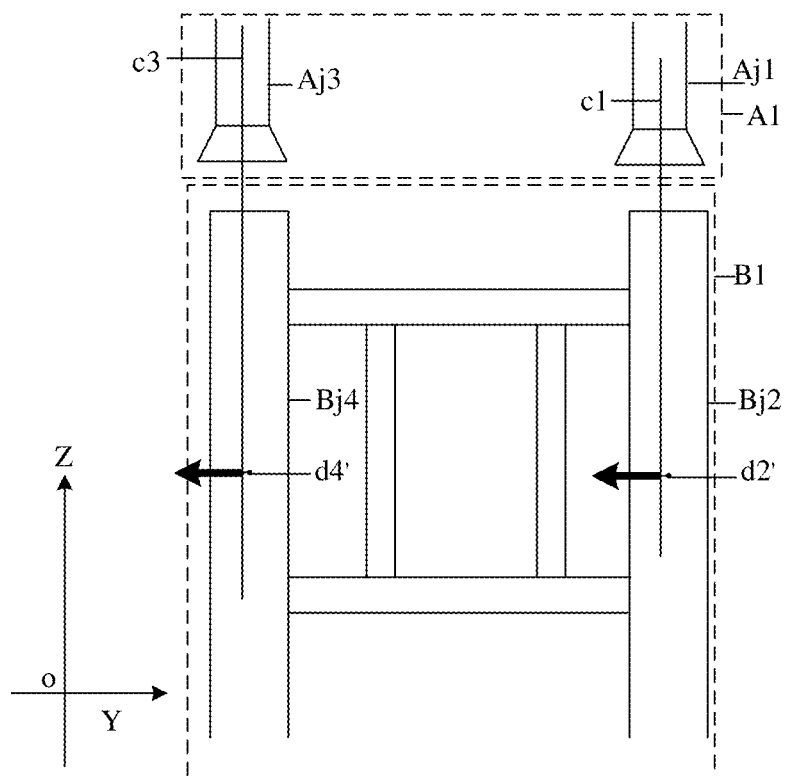

In FIG. 17, the first target image region A1 includes at least a partial region of a first foot cup Aj1 and at least a partial region of a third foot cup Aj3, and the first target image region A1 includes a center line c1 of the first foot cup Aj1 and a center line c3 of the third foot cup Aj3. The second target image region B1 includes at least a partial region of a second upright Bj2 and at least a partial region of a fourth upright Bj4, and the second target image region B1 includes a geometric center point d2' of the second upright Bj2 and a geometric center point d4' of the fourth upright Bj4.

The vertical vector (that is, a straight line pointing from d2' to c1 in FIG. 17) is generated based on a direction from the geometric center point d2' of the second upright Bj2 to the center line c1 of the first foot cup Aj1 according to the center line c1 of the first foot cup Aj1 and coordinates (x2', y2', z2') of the geometric center point d2' of the second upright Bj2. A direction of the vertical vector is indicated by an arrow pointing from d2' to c1.

The vertical vector (that is, a straight line pointing from d4' to c3 in FIG. 17) is generated based on a direction from the geometric center point d4' of the fourth upright Bj4 to the center line c3 of the third foot cup Aj3 according to the center line c3 of the third foot cup Aj3 and coordinates (x4', y4', z4') of the geometric center point d4' of the fourth upright Bj4. A direction of the vertical vector is indicated by an arrow pointing from d4' to c3.

In a ninth manner, the controller uses a first pixel relationship vector between a first center line in the first target image region and a second center point in the second target image region as a first pixel difference, the controller uses a second pixel relationship vector between a third center line in the first target image region and a fourth center point in the second target image region as a second pixel difference, the controller uses a third pixel relationship vector between a fifth center line in the first target image region and a sixth center point in the second target image region as a third pixel difference, and the controller uses a fourth pixel relationship vector between a seventh center line in the first target image region and an eighth center point in the second target image region as a fourth pixel difference.

When the first pixel difference is less than the threshold, the controller determines that a first foot cup of the first stacking object is aligned with a second upright of the second stacking object. When the second pixel difference is less than the threshold, the controller determines that a third foot cup of the first stacking object is aligned with a fourth upright of the second stacking object. When the third pixel difference is less than the threshold, the controller determines that a fifth foot cup of the first stacking object is aligned with a sixth upright of the second stacking object. When the fourth pixel difference is less than the threshold, the controller determines that a seventh foot cup of the first stacking object is aligned with an eighth upright of the second stacking object. In this way, it is determined that the first stacking object is aligned with the second stacking object.

Manners of generating the second pixel relationship vector, the third pixel relationship vector, and the fourth pixel relationship vector are similar to the manner of generating the first pixel relationship vector.

Figure 18:
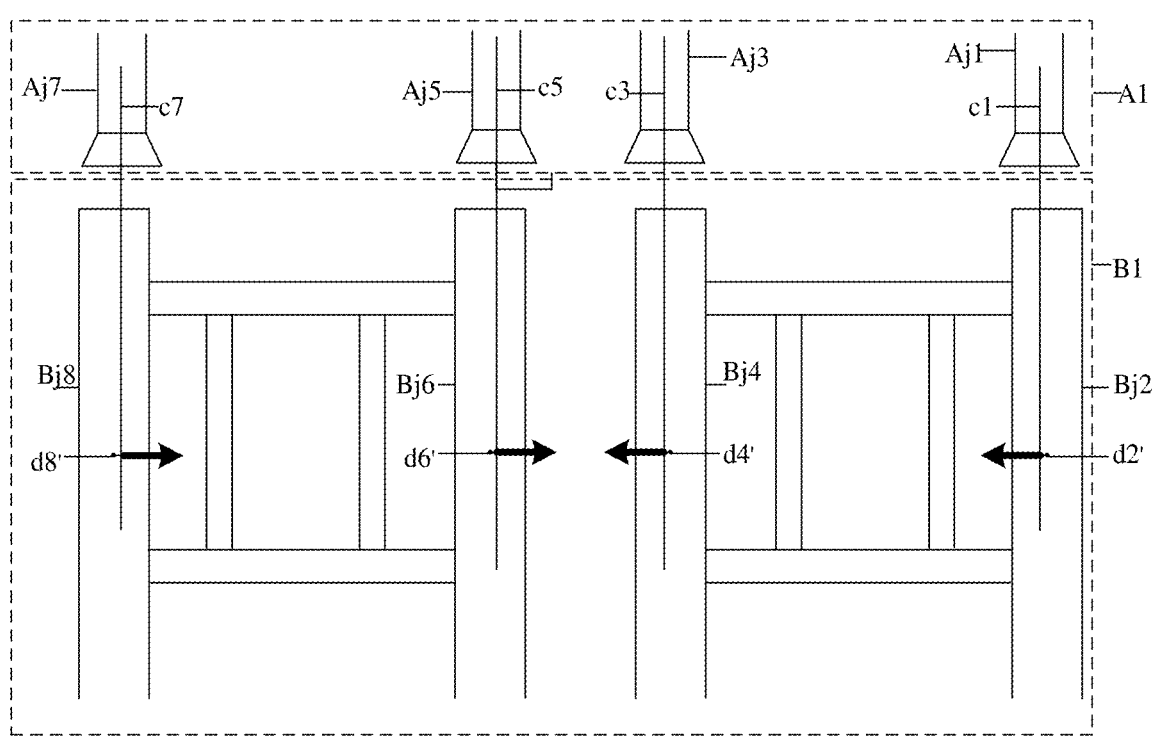

In FIG. 18, the first target image region A1 includes at least a partial region of a first foot cup Aj1, at least a partial region of a third foot cup Aj3, at least a partial region of a fifth foot cup Aj5, and at least a partial region of a seventh foot cup Aj7, and the first target image region A1 includes a center line c1 of the first foot cup Aj1, a center line c3 of the third foot cup Aj3, a center line c5 of the fifth foot cup Aj5, and a center line c7 of the seventh foot cup Aj7. The second target image region B1 includes at least a partial region of a second upright Bj2, at least a partial region of a fourth upright Bj4, at least a partial region of a sixth upright Bj6, and at least a partial region of an eighth upright Bj8, and the second target image region B1 includes a geometric center point d2' of the second upright Bj2, a geometric center point d4' of the fourth upright Bj4, a geometric center point d6' of the sixth upright Bj6, and a geometric center point d8' of the eighth upright Bj8.

The vertical vector (that is, a straight line pointing from d2' to c1 in FIG. 18) is generated based on a direction from the geometric center point d2' of the second upright Bj2 to the center line c1 of the first foot cup Aj1 according to the center line c1 of the first foot cup Aj1 and coordinates (x2', y2', z2') of the geometric center point d2' of the second upright Bj2. A direction of the vertical vector is indicated by an arrow pointing from d2' to c1.

The vertical vector (that is, a straight line pointing from d4' to c3 in FIG. 18) is generated based on a direction from the geometric center point d4' of the fourth upright Bj4 to the center line c3 of the third foot cup Aj3 according to the center line c3 of the third foot cup Aj3 and coordinates (x4', y4', z4') of the geometric center point d4' of the fourth upright Bj4. A direction of the vertical vector is indicated by an arrow pointing from d4' to c3.

The vertical vector (that is, a straight line pointing from d6' to c5 in FIG. 18) is generated based on a direction from the geometric center point d6' of the sixth upright Bj6 to the center line c5 of the fifth foot cup Aj5 according to the center line c5 of the fifth foot cup Aj5 and coordinates (x6', y6', z6') of the geometric center point d6' of the sixth upright Bj6. A direction of the vertical vector is indicated by an arrow pointing from d6' to c5.

The vertical vector (that is, a straight line pointing from d8' to c7 in FIG. 18) is generated based on a direction from the geometric center point d8' of the eighth upright Bj8 to the center line c7 of the seventh foot cup Aj7 according to the center line c7 of the seventh foot cup Aj7 and coordinates (x8', y8', z8') of the geometric center point d8' of the eighth upright Bj8. A direction of the vertical vector is indicated by an arrow pointing from d8' to c7.

The coordinates of the geometric center point d2' of the second upright Bj2, and the coordinates of the geometric center point d4' of the fourth upright Bj4 are the coordinates in the three-dimensional coordinate system in FIG. 2.

In an example, the second center point in the second target image region may be a center vertex of a second upright of a second material cage, the fourth center point may be a center vertex of a fourth upright of the second material cage, the sixth center point may be a center vertex of a sixth upright of the second material cage, and the eighth center point may be a center vertex of an eighth upright of the second material cage.

In an embodiment of the present disclosure, the alignment state between the first stacking object and the second stacking object may be determined in the following manner.

In a first manner, in this embodiment of the present disclosure, the comparing the pixel difference with the threshold, to determine the alignment state between the first stacking object and the second stacking object includes: if the pixel difference is greater than or equal to a first threshold, determining that the alignment state is not aligned; or if the pixel difference is less than a first threshold, determining that the alignment state is aligned.

In this embodiment of the present disclosure, when the pixel difference is greater than or equal to the first threshold, it is determined that the alignment state between the first stacking object and the second stacking object is not aligned, and the larger the difference between the pixel difference and the first threshold, the lower the alignment degree between the first stacking object and the second stacking object. When the pixel difference is less than the first threshold, it is determined that the alignment state between the first stacking object and the second stacking object is aligned, and the smaller the difference between the pixel difference and the first threshold, the higher the alignment degree between the first stacking object and the second stacking object.

In an example, in an embodiment of the present disclosure, when the pixel difference is greater than or equal to the first threshold, the method further includes: controlling, by the controller based on the pixel difference, material handling equipment to adjust a pose; re-acquiring, by the controller by using the sensor, a target image of the first stacking object and a target image of the second stacking object; re-determining, by the controller, a pixel difference between a first target image region and a second target image region; and re-determining, by the controller based on the re-determined pixel difference, the alignment state until the pixel difference is less than the first threshold.

In an example, in an embodiment of the present disclosure, when the pixel difference is less than the first threshold, the method further includes: when the alignment state is aligned, controlling, by the controller, material handling equipment to place the first stacking object onto the second stacking object, to complete stacking.

Herein, the pixel difference and the first threshold are used to measure the alignment state between the first stacking object and the second stacking object, and the first threshold may be set according to alignment accuracy of the first stacking object and the second stacking object.

Figure 19:
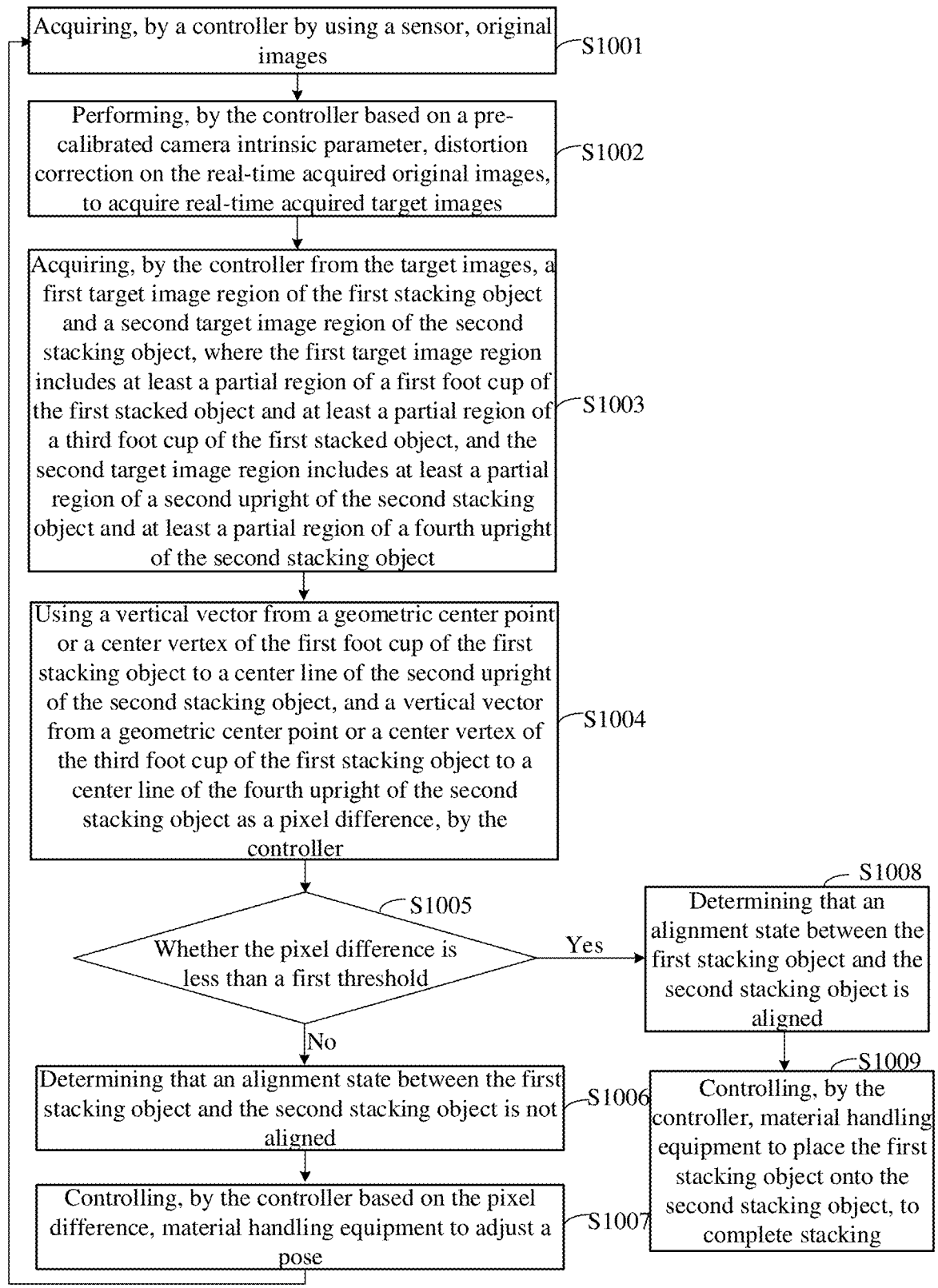
FIG. 19 is a schematic diagram of controlling material handling equipment to adjust a pose based on a pixel difference as an iteration criterion.

In FIG. 19, a controller calculates a pixel difference according to a point-to-line manner, to control material handling equipment to adjust a pose based on the pixel difference as an iteration criterion. The specific process is as follows.

Step S1001: Acquiring, by a controller by using a sensor, original images.

Step S1002: Performing, by the controller based on a pre-calibrated camera intrinsic parameter, distortion correction on the original images acquired in real-time by the sensor, to acquire target images.

Step S1003: Acquiring, by the controller from the target images, a first target image region of the first stacking object and a second target image region of the second stacking object.

In FIG. 19, an example is given where the first target image region includes at least a partial region of a first foot cup of the first stacking object and at least a partial region of a third foot cup of the first stacking object, and the second target image region includes at least a partial region of a second upright of the second stacking object and at least a partial region of a fourth upright of the second stacking object.

Step S1004: Using a vertical vector from a geometric center point or a center vertex of the first foot cup of the first stacking object to a center line of the second upright of the second stacking object, and a vertical vector from a geometric center point or a center vertex of the third foot cup of the first stacking object to a center line of the fourth upright of the second stacking object as a pixel difference, by the controller.

Step S1005: Determining, by the controller, whether the pixel difference is less than a first threshold.

Step S1006: When the pixel difference is greater than or equal to the first threshold, determining, by the controller, that an alignment state between the first stacking object and the second stacking object is not aligned, and executing Step S1007.

Step S1007: Controlling, by the controller based on the pixel difference, material handling equipment to adjust a pose, and continuing to execute Step S1001 to Step S1005 until the pixel difference is less than the first threshold, and then executing Step S1008 and Step S1009.

Step S1008: When the pixel difference is less than the first threshold, determining, by the controller, that an alignment state between the first stacking object and the second stacking object is aligned.

Step S1009: Controlling, by the controller, material handling equipment to place the first stacking object onto the second stacking object, to complete stacking.

In this embodiment of the present disclosure, the material handling equipment may be controlled to adjust the pose based on the pixel difference and/or a control quantity.

Following the determining the pixel difference in Step S305, the method further includes: determining, based on the pixel difference, a control quantity using inverse kinematics; and controlling, based on the control quantity, the material handling equipment to adjust the pose.

In this embodiment of the present disclosure, the controller uses the pixel difference to calculate the control quantity from a current pose to a target pose using the IKP (Inverse Kinematics), to control the material handling equipment to adjust its pose.

The current pose refers to a pose of the material handling equipment at the current moment (such as a pose of a fork at the current moment or a pose of a chassis of the material handling equipment at the current moment). The target pose generally refers to a pose that is expected to be reached by the material handling equipment, and the pose is determined based on a stacking task requirement and a working environment.

Figure 20:
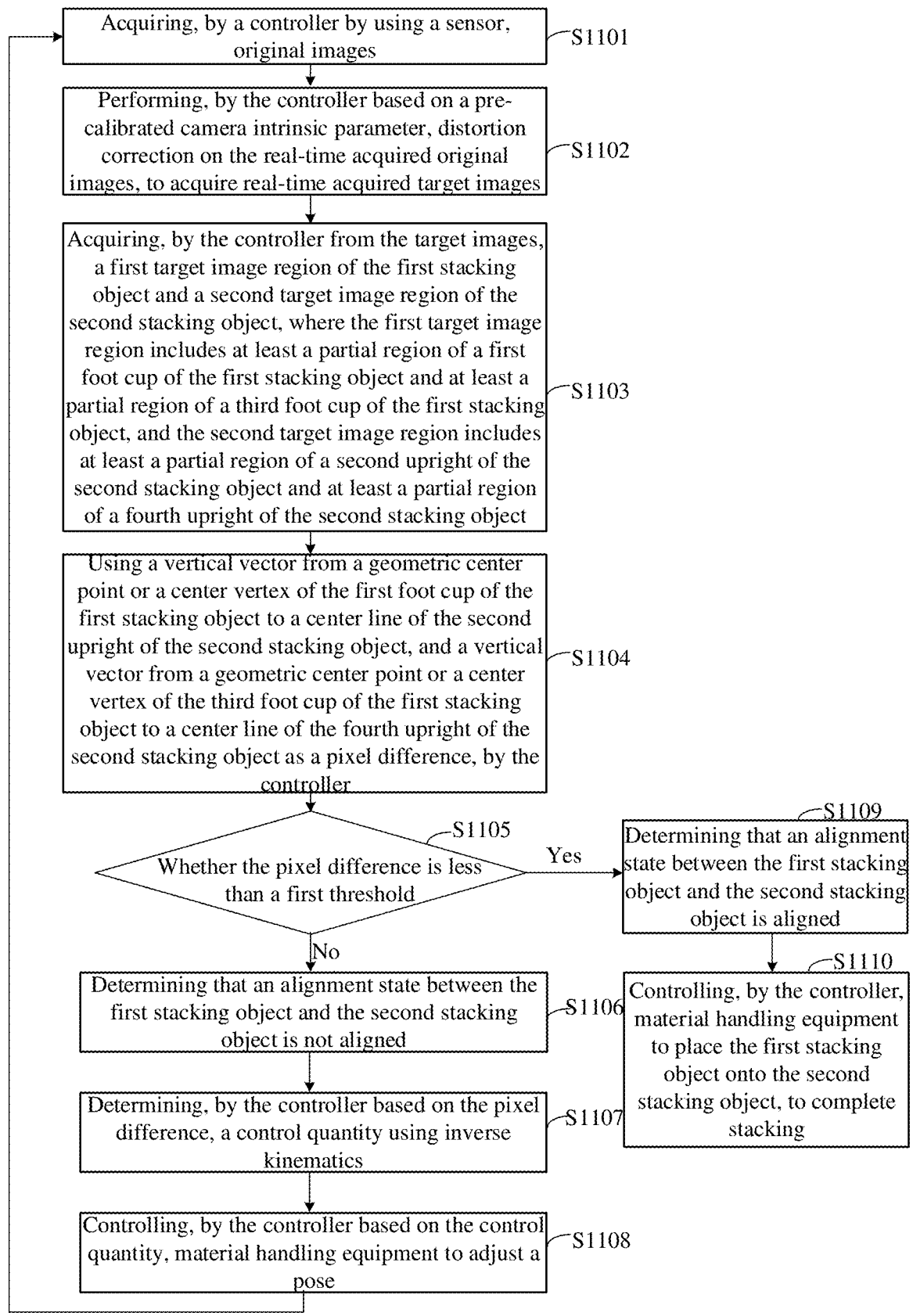
FIG. 20 is a first schematic diagram of controlling material handling equipment to adjust a pose based on a control quantity as an iteration criterion.

In FIG. 20, a controller calculates a pixel difference according to a point-to-line manner, determines a control quantity based on the pixel difference using inverse kinematics, and controls material handling equipment to adjust a pose based on the control quantity. The specific process is as follows.

Step S1101: Acquiring, by a controller by using a sensor, original images.

Step S1102: Performing, by the controller based on a pre-calibrated camera intrinsic parameter, distortion correction on the original images acquired in real-time by the sensor, to acquire target images.

Step S1103: Acquiring, by the controller from the target images, a first target image region of the first stacking object and a second target image region of the second stacking object.

In FIG. 20, an example is given where the first target image region includes at least a partial region of a first foot cup of the first stacking object and at least a partial region of a third foot cup of the first stacking object, and the second target image region includes at least a partial region of a second upright of the second stacking object and at least a partial region of a fourth upright of the second stacking object.

Step S1104: Using a vertical vector from a geometric center point or a center vertex of the first foot cup of the first stacking object to a center line of the second upright of the second stacking object, and a vertical vector from a geometric center point or a center vertex of the third foot cup of the first stacking object to a center line of the fourth upright of the second stacking object as a pixel difference, by the controller.

Step S1105: Determining, by the controller, whether the pixel difference is less than a first threshold.

Step S1106: When the pixel difference is greater than or equal to the first threshold, determining, by the controller, that an alignment state between the first stacking object and the second stacking object is not aligned, and executing Step S1107.

Step S1107: Determining, by the controller based on the pixel difference, a control quantity using inverse kinematics.

In some embodiments, taking the control quantity as velocity as an example, the control quantity may be determined using the following calculation method:

$$\vec{u} = \begin{pmatrix} v_x \\ v_y \\ w_z \end{pmatrix} = KJ_v^{-1}\vec{e}$$

where $\vec{u}$ is a velocity control quantity, and may include velocities in multiple directions, such as $v_x$, $v_y$, and $w_z$; K is a constant; $J_v^{-1}$ is an inverse operation of a Jacobian matrix based on velocity; and $\vec{e}$ is a pixel difference.

Step S1108: Controlling, by the controller based on the control quantity, material handling equipment to adjust a pose, and continuing to execute Step S1101 to Step S1105 until the pixel difference is less than the first threshold, and then executing Step S1109 and Step S1110.

Step S1109: When the pixel difference is less than the first threshold, determining, by the controller, that the alignment state between the first stacking object and the second stacking object is aligned.

Step S1110: Controlling, by the controller, material handling equipment to place the first stacking object onto the second stacking object, to complete stacking.

In a second manner, the control quantity is determined based on the pixel difference using the inverse kinematics; and if the control quantity is greater than or equal to a second threshold, it is determined that the alignment state is not aligned, or if the control quantity is less than a second threshold, it is determined that the alignment state is aligned.

In an example, in this embodiment of the present disclosure, when the control quantity is greater than or equal to the second threshold, the method further includes: when the alignment state is not aligned, controlling material handling equipment to adjust a pose based on the control quantity; re-acquiring, by the controller by using the sensor, a target image of the first stacking object and a target image of the second stacking object; re-determining, by the controller, a pixel difference between a first target image region and a second target image region; re-determining, by the controller based on the pixel difference, a control quantity; and re-determining, by the controller based on the control quantity, the alignment state until the control quantity is less than the second threshold.

In an example, in this embodiment of the present disclosure, when the control quantity is less than the second threshold, the method further includes: when the alignment state is aligned, controlling material handling equipment to place the first stacking object onto the second stacking object, to complete stacking.

Figure 21:
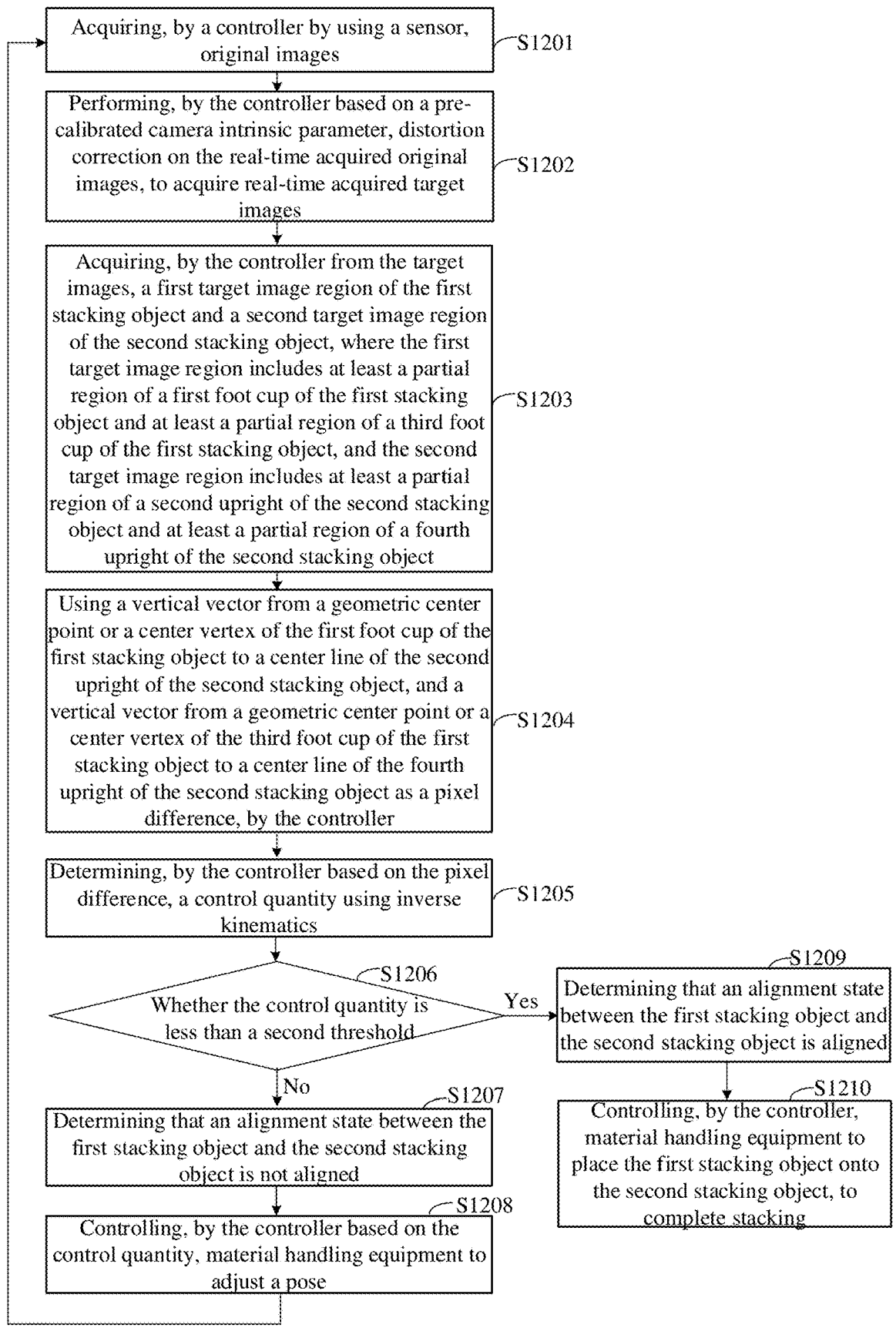
FIG. 21 is a second schematic diagram of controlling material handling equipment to adjust a pose based on a control quantity as an iteration criterion.

In FIG. 21, a controller calculates a pixel difference, determines a control quantity based on the pixel difference using inverse kinematics, and controls material handling equipment to adjust a pose based on the control quantity. The specific process is as follows.

Step S1201: Acquiring, by a controller by using a sensor, original images.

Step S1202: Performing, by the controller based on a pre-calibrated camera intrinsic parameter, distortion correction on the original images acquired in real-time by the sensor, to acquire target images.

Step S1203: Acquiring, by the controller from the target images, a first target image region of the first stacking object and a second target image region of the second stacking object.

The first target image region includes at least a partial region of a first foot cup of the first stacking object and at least a partial region of a third foot cup of the first stacking object, and the second target image region includes at least a partial region of a second upright of the second stacking object and at least a partial region of a fourth upright of the second stacking object.

Step S1204: Using a vertical vector from a geometric center point or a center vertex of the first foot cup of the first stacking object to a center line of the second upright of the second stacking object, and a vertical vector from a geometric center point or a center vertex of the third foot cup of the first stacking object to a center line of the fourth upright of the second stacking object as a pixel difference, by the controller.

Step S1205: Determining, by the controller based on the pixel difference, a control quantity using inverse kinematics.

Step S1206: Determining, by the controller, whether the control quantity is less than a second threshold.

Step S1207: When the control quantity is greater than or equal to the second threshold, determining, by the controller, that the alignment state between the first stacking object and the second stacking object is not aligned, and executing Step S1208.

Step S1208: Controlling, by the controller based on the control quantity, material handling equipment to adjust a pose, and continuing to execute Step S1201 to Step S1206 until the control quantity is less than the second threshold, and then executing Step S1209 and Step S1210.

Step S1209: When the control quantity is less than the second threshold, determining, by the controller, that the alignment state between the first stacking object and the second stacking object is aligned.

Step S1210: Controlling, by the controller, material handling equipment to place the first stacking object onto the second stacking object, to complete stacking.

Herein, the control quantity and the second threshold are used to measure whether to control the material handling equipment to control the first stacking object to be aligned with the second stacking object, and the second threshold may be set according to alignment accuracy of the first stacking object and the second stacking object.

The controlling, based on the pixel difference, the material handling equipment to adjust the pose may include controlling the material handling equipment to adjust a pose of a fork and/or controlling the material handling equipment to adjust a pose of a chassis.

In some embodiments, before the alignment state is determined, the material handling equipment moves the first stacking object to a stacking preparation position, to complete a pre-alignment action relative to the second stacking object. The stacking preparation position refers to a position before a stacking operation position is reached, and the pose of the second stacking object can be acquired by the material handling equipment in this position.

The stacking operation position is a position in which a sensor on the material handling equipment may acquire both target data (for example, a target image) of the first stacking object and target data of the second stacking object.

Pre-alignment refers to that the first stacking object and the second stacking object are basically aligned in a Y-axis direction by adjusting a pose of the material handling equipment. That is, a difference $\Delta Y$ in Y-axis coordinates between the first stacking object and the second stacking object and a difference $\Delta \Psi$ in rotation angles around a Z-axis between the first stacking object and the second stacking object are within preset thresholds. The thresholds may be flexibly adjusted according to different material handling equipment and different stacking objects, for example, $-5$ cm$<\Delta Y<5$ cm, and $-3°<\Delta\Psi<3°$.

In a pre-alignment phase, the material handling equipment carries the first stacking object to a front of the second stacking object, then the material handling equipment first lifts a fork to an optimal detection height, calculates a pose of an upright by detecting a feature such as an upright of the second stacking object, and adjusts a chassis or the fork, to complete pre-alignment. In this phase, in order to ensure that the AGF is substantially aligned with the second stacking object in a travel direction and a rotating direction, large error correction is implemented by using both a forward path planning strategy and a backward path planning strategy, to ensure that the first stacking object is substantially aligned with the second stacking object.

The foregoing method provided in this embodiment of the present disclosure may be applied to a plurality of application scenarios, including but not limited to an unmanned warehouse scenario or an unmanned loading and unloading scenario.

An unmanned warehouse may include material handling equipment, a storage rack, a picking station, an RCS (Reaction Control System), a WMS (Warehouse Management System), and the like.

The unmanned loading and unloading scenario includes material handling equipment, an RCS, and a truck.

According to specific embodiments provided in the present disclosure, the present disclosure discloses the following technical effects.

First, in the present disclosure, an alignment state between a first stacking object and a second stacking object is determined based on a pixel difference between a first target image region of the first stacking object and a second target image region of the second stacking object. By using this solution, impacts of an external environment (for example, uneven ground) and an error of material handling equipment may be prevented, and pose data of a first stacking object and a second stacking object may be accurately calculated, thereby determining an alignment state between the first stacking object and the second stacking object.

Second, in the present disclosure, distortion correction is performed on original images collected by a sensor using a pre-calibrated sensor intrinsic parameter, so that an undistorted target image can be acquired.

Third, in the present disclosure, a pixel relationship vector includes a vertical vector from a center point of a foot cup to a center line of an upright; and/or a connection vector from a center point of a foot cup to a center vertex of an upright. A pixel difference is determined based on these various manners, so that pose data of a first stacking object and a second stacking object can be accurately calculated, thereby determining an alignment state between the first stacking object and the second stacking object.

Fourthly, in the present disclosure, when an alignment state between a first stacking object and a second stacking object is not aligned, a controller controls material handling equipment to adjust a pose based on a pixel difference, and controls a sensor to re-acquire target images of the first stacking object and the second stacking object. The controller re-determines a pixel difference between a first target image region and a second target image region, and re-determines the alignment state between the first stacking object and the second stacking object based on the re-determined pixel difference until the pixel difference is less than a first threshold. This forms a closed-loop servo detection process. In this servo detection process, it is not required to stop running of material handling equipment, thereby improving handling efficiency.

Fifthly, in the present disclosure, when an alignment state between a first stacking object and a second stacking object is not aligned, a controller controls material handling equipment to adjust a pose based on a control quantity, and controls a sensor to re-acquire target images of the first stacking object and the second stacking object. The controller re-determines a control quantity based on a first target image region and a second target image region, and re-determines the alignment state between the first stacking object and the second stacking object based on the re-determined control quantity until the control quantity is less than a second threshold. This forms a closed-loop servo detection process. In this servo detection process, it is not required to stop running of material handling equipment, thereby improving handling efficiency.

Certainly, any invention of the present disclosure is not necessarily required to achieve all of the advantages described above.

The foregoing describes specific embodiments of this specification. Other embodiments fall within the scope of the appended claims. In some cases, actions or steps recorded in the claims may be executed in an order other than those described in the embodiments, while still bringing desired results. In addition, the desired results do not require a process illustrated in the drawings to necessarily follow the shown specific order or sequential order. In some implementations, multitasking and parallel processing are also possible or may be advantageous.

According to another embodiment, a controller is provided, and the controller is configured to execute program instructions, to implement any method for determining an alignment state disclosed in embodiments of the present disclosure.

Embodiments in this specification are all described in a progressive manner, for same or similar parts in embodiments, mutual reference may be made. Each embodiment focuses on what is different from other embodiments. Especially, system embodiments or apparatus embodiments are basically similar to method embodiments, and therefore are described briefly; and for related parts, reference may be made to partial descriptions in the method embodiments. The system and apparatus embodiments described above are merely an example. The units described as separate parts may be or may not be physically separate, and parts displayed as units may be or may not be physical units, that is, may be located at one position, or may be distributed on a plurality of network units. Some or all of the modules may be selected according to an actual need to achieve the objectives of the solutions of the embodiments. A person of ordinary skill in the art may understand and implement embodiments of the present disclosure without creative efforts.

In addition, an embodiment of the present disclosure further provides a computer-readable storage medium, where the computer-readable storage medium stores a computer program. When the program is executed by a controller, steps of a method in any one of the foregoing method embodiments are implemented.

Material handling equipment is further provided in the present disclosure, including: a material handling equipment body; a sensor, where the sensor is mounted on the material handling equipment body; and one or more controllers. Program instructions, when being read and executed by the one or more controllers, execute all or some of the steps in any one of methods for determining an alignment state described in the foregoing embodiments. For example, the controller includes a memory and a processor, and the memory is used to store the program instructions.

In some embodiments, the material handling equipment body includes a body of the material handling equipment.

The present disclosure further provides a computer program product, including a computer program. When the computer program is executed by a controller, steps of a method in any one of the foregoing method embodiments are implemented.

Based on the foregoing descriptions of the implementations, a person skilled in the art may clearly understand that the present disclosure may be implemented by software in addition to a necessary universal hardware platform. Based on such an understanding, the technical solutions of the present disclosure essentially or the part contributing to the conventional technology may be embodied in the form of a computer program product. The computer program product may be stored in a storage medium, such as a ROM or RAM, a magnetic disk, or an optical disc.

The technical solutions provided in the present disclosure are described above in detail. The principles and implementations of the present disclosure are described herein by using specific examples. The descriptions of the above embodiments are merely provided to help understand the methods and core ideas of the present disclosure. In addition, a person of ordinary skill in the art can make variations to the present disclosure in terms of the specific implementations and application scopes according to the ideas of the present disclosure. In conclusion, the content of this specification should not be construed as a limitation of the present disclosure.

What is claimed is:

1. A material handling equipment, comprising a controller, wherein the controller is configured to execute program instructions, to implement the following steps:
   acquiring, by using a sensor, target images of a first stacking object and a second stacking object;
   acquiring, from the target images, a first target image region of the first stacking object and a second target image region of the second stacking object; and
   determining a pixel difference between the first target image region and the second target image region, and comparing the pixel difference with a threshold, to determine an alignment state between the first stacking object and the second stacking object,
   wherein the controller is further configured to execute the following steps:
   before determining the alignment state, controlling material handling equipment to move the first stacking object to a stacking preparation position, to complete a pre-alignment action relative to the second stacking object.

2. The material handling equipment according to claim 1, wherein the acquiring, by using the sensor, the target images of the first stacking object and the second stacking object comprises:
   acquiring, by using the sensor, original images of the first stacking object and the second stacking object; and
   performing, based on a pre-calibrated sensor intrinsic parameter, distortion correction on the original images, to acquire the target images.

3. The material handling equipment according to claim 1, wherein the determining the pixel difference between the first target image region and the second target image region comprises:
   using a pixel relationship vector between a first center point in the first target image region and a second center line in the second target image region as the pixel difference.

4. The material handling equipment according to claim 3, wherein the pixel relationship vector is a vertical vector from the first center point to the second center line.

5. The material handling equipment according to claim 4, wherein the first stacking object is a first material cage, and the second stacking object is a second material cage; and
   the first center point is a geometric center point or a central vertex of a first foot cup of the first material cage, and the second center line is a center line of a second upright of the second material cage.

6. The material handling equipment according to claim 1, wherein the determining the pixel difference between the first target image region and the second target image region comprises:
   using a pixel relationship vector between a first center point in the first target image region and a second center point in the second target image region as the pixel difference.

7. The material handling equipment according to claim 6, wherein the pixel relationship vector is a connection vector from the first center point to the second center point.

8. The material handling equipment according to claim 7, wherein the first stacking object is a first material cage, and the second stacking object is a second material cage; and
   the first center point is a geometric center point or a central vertex of a first foot cup of the first material cage, and the second center point is a geometric center point or a central vertex of a second upright of the second material cage.

9. The material handling equipment according to claim 1, wherein the determining the pixel difference between the first target image region and the second target image region comprises:
   using a pixel relationship vector between a first center line in the first target image region and a fourth center point in the second target image region as the pixel difference.

10. The material handling equipment according to claim 9, wherein the pixel relationship vector is a vertical vector from the fourth center point to the first center line.

11. The material handling equipment according to claim 10, wherein the first stacking object is a first material cage, and the second stacking object is a second material cage; and
   the first center line is a center line of a first foot cup of the first material cage, and the fourth center point is a geometric center point or a central vertex of a second upright of the second material cage.

12. The material handling equipment according to claim 1, wherein the comparing the pixel difference with the threshold, to determine the alignment state between the first stacking object and the second stacking object comprises:
   in a case that the pixel difference is greater than or equal to a first threshold, determining that the alignment state is not aligned; or in a case that the pixel difference is less than a first threshold, determining that the alignment state is aligned.

13. The material handling equipment according to claim 12, wherein the controller is further configured to execute the following steps:
in a case that the alignment state is not aligned, controlling, based on the pixel difference, material handling equipment to adjust a pose;
re-acquiring, by using the sensor, a target image of the first stacking object and a target image of the second stacking object;
re-determining a pixel difference between a first target image region and a second target image region; and
re-determining, based on the pixel difference, the alignment state until the pixel difference is less than the first threshold.

14. The material handling equipment according to claim 13, wherein the controlling, based on the pixel difference, the material handling equipment to adjust the pose comprises:
determining, based on the pixel difference, a control quantity using inverse kinematics; and
controlling, based on the control quantity, the material handling equipment to adjust the pose, the pose comprising a pose of a chassis or a pose of a fork.

15. The material handling equipment according to claim 12, wherein the controller is further configured to execute the following steps:
in a case that the alignment state is aligned, controlling material handling equipment to place the first stacking object onto the second stacking object, to complete stacking.

16. The material handling equipment according to claim 1, wherein the first stacking object is a first material cage, and the second stacking object is a second material cage;
the first target image region comprises at least a partial region of a first foot cup of the first material cage and at least a partial region of a third foot cup of the first material cage; and
the second target image region comprises at least a partial region of a second upright of the second material cage and at least a partial region of a fourth upright of the second material cage.

17. The material handling equipment according to claim 16, wherein the first target image region further comprises at least a partial region of a fifth foot cup of the first material cage and at least a partial region of a seventh foot cup of the first material cage; and
the second target image region further comprises at least a partial region of a sixth upright of the second material cage and at least a partial region of an eighth upright of the second material cage.

18. A controller, wherein the controller is configured to execute program instructions, to implement the following steps:
acquiring, by using a sensor, target images of a first stacking object and a second stacking object;
acquiring, from the target images, a first target image region of the first stacking object and a second target image region of the second stacking object; and
determining a pixel difference between the first target image region and the second target image region, and comparing the pixel difference with a threshold, to determine an alignment state between the first stacking object and the second stacking object,
wherein the controller is further configured to execute the following steps:
before determining the alignment state, controlling material handling equipment to move the first stacking object to a stacking preparation position, to complete a pre-alignment action relative to the second stacking object.

19. A method for determining an alignment state, comprising:
acquiring, by using a sensor, target images of a first stacking object and a second stacking object;
acquiring, from the target images, a first target image region of the first stacking object and a second target image region of the second stacking object; and
determining a pixel difference between the first target image region and the second target image region, and comparing the pixel difference with a threshold, to determine an alignment state between the first stacking object and the second stacking object,
wherein the method further comprises:
before determining the alignment state, controlling material handling equipment to move the first stacking object to a stacking preparation position, to complete a pre-alignment action relative to the second stacking object.

* * * * *